(12) United States Patent
Herrmann et al.

(10) Patent No.: US 10,806,002 B2
(45) Date of Patent: Oct. 13, 2020

(54) REAR VIEW DEVICE ASSEMBLIES AND CIRCUITS

(71) Applicant: SMR Patents S.à.r.l., Luxembourg (LU)

(72) Inventors: Andreas Herrmann, Stuttgart (DE); Romeo Wieczorek, Stuttgart (DE); Kollu Harsha Vardhan Rao, Bengaluru (IN)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/726,054

(22) Filed: Dec. 23, 2019

(65) Prior Publication Data

US 2020/0137853 A1    Apr. 30, 2020

Related U.S. Application Data

(63) Continuation-in-part of application No. 16/173,417, filed on Oct. 29, 2018, which is a continuation-in-part
(Continued)

(30) Foreign Application Priority Data

May 12, 2014 (EP) ..................................... 14167967
Dec. 23, 2015 (EP) ..................................... 15202515

(51) Int. Cl.
*H05B 33/08* (2020.01)
*H05B 45/24* (2020.01)
(Continued)

(52) U.S. Cl.
CPC ......... *H05B 45/325* (2020.01); *B60R 1/1207* (2013.01); *H05B 45/24* (2020.01); *B60R 2001/1253* (2013.01)

(58) Field of Classification Search
CPC ............... H05B 33/08; H05B 33/0815; H05B 33/0872; H05B 37/02; H05B 45/24;
(Continued)

(56) References Cited

U.S. PATENT DOCUMENTS 6,989,635 B2 * 1/2006 Iwaki .................... H05B 45/395
  315/82
9,402,288 B2 * 7/2016 Xu ........................ G09G 3/342
(Continued)

*Primary Examiner* — Thai Pham
(74) *Attorney, Agent, or Firm* — Jones Day

(57) ABSTRACT

A control circuit for an illumination module in a vehicle includes an input channel for receiving a pulse width modulated (PWM) signal, a filter configured to extract information received by the input channel, one or more first light sources, one or more second light sources, a first output channel which is adapted to control on and off states of the one or more first light sources depending on the extracted information, and a second output channel which is adapted to control on and off states of the one or more second light source connected to the second output channel depending on the extracted information, and an electronic circuit connected to the first output channel and including a circuit carrier which includes the one or more first light sources, and at least one circuit connection mounted to the circuit carrier.

20 Claims, 18 Drawing Sheets

Related U.S. Application Data of application No. 15/384,047, filed on Dec. 19, 2016, now Pat. No. 10,124,722, and a continuation-in-part of application No. 15/377,571, filed on Dec. 13, 2016, application No. 16/726,054, which is a continuation-in-part of application No. 15/310,620, filed as application No. PCT/IB2015/053278 on May 5, 2015.

(51) Int. Cl.
*H05B 47/10* (2020.01)
*B60R 1/02* (2006.01)
*B60R 1/12* (2006.01)
*H05B 45/325* (2020.01)

(58) Field of Classification Search
CPC ...... H05B 45/325; H05B 47/10; H05B 47/20; H05B 47/21; B60R 1/02; B60R 1/12; B60R 1/1207; B60R 1/06; B60R 2300/8026
See application file for complete search history.

(56) References Cited

U.S. PATENT DOCUMENTS

| | | | |
|---|---|---|---|
| 10,136,485 B1 * | 11/2018 | Coetzee | H05B 45/00 |
| 2002/0041498 A1 * | 4/2002 | Furst | F21S 43/14 |
| | | | 362/494 |
| 2010/0244724 A1 * | 9/2010 | Jacobs | H05B 47/10 |
| | | | 315/253 |
| 2015/0351190 A1 * | 12/2015 | Walters | H05B 45/37 |
| | | | 315/186 |
| 2016/0255687 A1 * | 9/2016 | Zhang | H05B 45/10 |
| | | | 315/210 |

* cited by examiner

REAR VIEW DEVICE ASSEMBLIES AND CIRCUITS

CROSS-REFERENCE TO RELATED APPLICATIONS

This application is a continuation-in-part of U.S. patent application Ser. No. 15/310,620, which is a National Phase of International Patent Application No. PCT/IB2015/053278 filed May 5, 2015, which claims priority to European Patent Application No. 14167967.0, filed May 12, 2014; and a continuation-in-part of U.S. patent application Ser. No. 16/173,417, filed Oct. 29, 2018, which is a continuation-in-part of U.S. patent application Ser. No. 15/377,571, filed Dec. 13, 2016, which is a continuation-in-part of U.S. patent application Ser. No. 15/384,047, filed Dec. 19, 2016, now U.S. Pat. No. 10,124,722, which claims the benefit of priority to European Patent Application No. 15 202 515, filed Dec. 23, 2015, each of which is hereby incorporated by reference in its entirety for all purposes.

BACKGROUND

1. Field of the Invention

The present disclosure relates generally to a signal light that is integrated in a module housing of a vehicle. For example, a vehicle may include a camera module for providing a driver with a view of the side or rear of the vehicle, and the camera module housing may include one or more signaling lamps that may be used as indicators, warning lights, blind spot assistance lights, welcoming lights, among other uses. The camera module housing may be integrated with a side-view mirror, may be separate from a side-view mirror, or may replace a side-view mirror so that the vehicle includes the camera module housing without a side-view mirror.

The present disclosure also relates to a control circuit for controlling a lighting application in a vehicle. For example, a monitoring circuit and a rear view display device for a vehicle having such a control circuit or monitoring circuit installed therein. According to one example, a control circuit may activate a first light source to flash while simultaneously activating a second light source to be permanently lit.

The present disclosure further relates to an electronic circuit for a blind-spot monitoring display, having a circuit carrier, and a first and second light source mounted to the circuit carrier. A circuit connection is mounted to the circuit carrier, which circuit connection is coupled to the first light source and the second light source. The electronic circuit includes circuit means which are designed, on the basis of a polarity of a voltage applied to the circuit connection to supply current either to the first light source or to the second light source.

2. Related Art

There are many applications of external vehicle lighting systems. First, with the emergence of autonomous vehicles, several concepts have been developed for identifying or marking autonomous vehicles as compared to manually operated vehicles on the road. One common concept is to mark autonomous vehicles using a new light-drive so that other road users may see the light from any angle and identify the vehicle as an autonomous vehicle. This may include activating the mirror indicator so that it is permanently lit in a different color. However, if the vehicle were to make a turn, the turn signal would no longer be available as it is being permanently lit in a different color. Further, the color of the turn signal is regulated by law and, in certain jurisdictions, may not be changed to a different color. Thus, according to at least one aspect, there is a need for a mechanism which controls two light sources to operate simultaneously.

In other applications, turn signal lamps are used to replace side-view mirrors where turn signal lamps include a camera for providing a driver with a view of the side or rear of the vehicle. That is, side-view mirrors are being replaced with camera modules that include a lighting mechanism for turn signals. Such turn signal lamps or camera modules are typically positioned on the side of the vehicle and include light emitting diodes (LEDs) and light guides that are arranged so that drivers of other vehicles can easily detect when a driver intends to turn. For example, U.S. Patent Application Publication No. 2016/207444 A1 to Tatara, et al. describes a camera module housing that includes light emitting diodes and light passages that are arranged for turn signal indication.

In some vehicle lighting applications, lighting devices having different colors may be used and separately controllable. If several lighting devices, e.g. light sources that have different colors and which are separately controllable, are used in components of a vehicle, for example in a rear view mirror, additional wiring, such as wiring for a second supply voltage, and/or a BUS connection needs to be utilized for controlling the lighting devices independently from each other such that the indicator can alternately flash in different colors.

For example, U.S. Pat. No. 8,674,285 B2 to Drummond, et al. describes a vehicle rearview device system, wherein several devices comprised in a rear-view device are controlled via a vehicle's BUS system, such as a LIN, CAN, Flexray or Ethernet system or an SMBus. However, most rear view devices do not include interfaces for an additional voltage supply and/or an interface for the vehicle's BUS system to control several lighting devices independently. Also, introducing corresponding interfaces would increase the complexity and costs of the overall system.

Vehicle lighting systems may also be utilized for driver assistance, like blind-spot monitoring. Driver-assistance systems can perceive, and interpret, the environment of the vehicle on the basis of environment sensors such as radar, video, infra-red, and ultrasound. They support the driver in numerous driving situations and thereby increase driver comfort and driver safety. Driver-assistance systems contribute to increasing safety by supporting the driver in critical situations in which fast and safe action is necessary. In dangerous situations in which vehicles are located in the blind spot, i.e. in the area around the vehicle which a driver cannot see, a blind-spot monitor supports the driver by displaying potential dangers caused by vehicles being located in the blind spot of the vehicle. The space available in the vehicle for accommodating an electronic circuit for the blind-spot monitoring display is limited, in particular in the exterior mirror of the vehicle, predetermined by the construction. The size of the available space in the area of the blind-spot display is limited. As a result, the module cannot be mounted to any extent at all or only at a single position. A multicolored display that requires a three-pin connection is defined as requested by the customer. This limits the number of plugs available on the market and increases the required space available for the display. Additionally, three copper wires have to be laid to the display, which requires weight and space for laying cables in the base of the mirror and an additional plug-in space on the mirror-car connection.

Thus, camera modules that include an improved arrangement of LEDs and light guides for providing improved visibility to a driver of a vehicle is needed. Also, versatility in light indications provided by a camera module; for example, by using indicators that include more than one color, is needed. Further, there is a need for an improved control circuit that can be used for controlling at least two lighting devices and that doesn't need to be connected to a vehicle's bus system, and/or doesn't need to utilize several input voltages to control the lighting devices independently. And, any illumination device should have a circuit as compact as possible to efficiently utilize space, as required for example by a blind spot monitoring device implemented within the vehicle.

SUMMARY

In an aspect, a control circuit for an illumination module in a vehicle includes an input channel for receiving a pulse width modulated (PWM) signal, a filter configured to extract information received by the input channel, one or more first light sources, one or more second light sources, a first output channel which is adapted to control on and off states of the one or more first light sources depending on the extracted information, and a second output channel which is adapted to control on and off states of the one or more second light source connected to the second output channel depending on the extracted information, and an electronic circuit connected to the first output channel and including: a circuit carrier which comprises the one or more first light sources; and at least one circuit connection mounted to the circuit carrier, the circuit connection being coupled to at least one of the one or more first light sources, where at least one of the one or more first light sources are supplied with current corresponding to a voltage applied to the circuit connection, and wherein the voltage applied to the circuit connection comprises an on-board voltage of the vehicle.

In another aspect, a control circuit includes an input channel for receiving a pulse width modulated (PWM) signal, a first light source and a first output channel which is adapted to control on and off states of the first light source, and a second light source and a second output channel which is adapted to control on and off states of the second light source connected to the second output channel, where the first output channel is adapted to turn the first light source on and the second output channel is adapted to turn the second light source off based on a first PWM signal, the first output channel is adapted to turn the first light source off and the second output channel is adapted to turn the second light source on based on a second PWM signal, and the first output channel is adapted to turn the first light source on and the second output channel is adapted to turn the second light source on, at the same time, based on a third PWM signal.

In response to either the first PWM signal or the second PWM signal being transmitted consecutively with the third PWM signal during a period of time, one of the first light source and the second light source may be permanently lit while the other of the first light source and the second light source flashes on and off.

The first and the second light source may include at least one light each or an array of lights, wherein the first light source comprises a first light having a first color, and wherein the second light source comprises a second light having a second color.

The first and second colors may be different colors, and the first and second light sources may be provided in a side-turn indicator.

Each of the first and second light sources may include at least one of a Light Emitting Diode (LED), a light bulb, a halogen lamp, an arc lamp, a Xenon arc lamp, a fluorescent lamp, a neon lamp, and an electrodeless lamp.

At least one of the first output channel or the second output channel may include a delay circuit for time delaying the output channel.

The first PWM signal may include a duty cycle rate of 20%, the second PWM signal may include a duty cycle rate of 100%, and the third PWM signal may include a duty cycle rate of 80%.

The control circuit may include at least one filter circuit to extract information from each of the first PWM signal, the second PWM signal, and the third PWM signal.

The PWM signal may include the supply voltage for at least one of the first light source or the second light source.

In another aspect, a rear view display device for a vehicle includes the control circuit.

In yet another aspect, a control circuit includes a first light source, a second light source, an input channel for receiving an input signal, at most two output channels each configured to control one of the first light source and the second light source, where the control circuit is configured to use at most two cables, and is capable of permanently powering on one of the first light source and the second light source while, at the same time, flashing on and off the other of the first light source and the second light source.

The input signal may be a pulse width modulated (PWM) signal.

Permanently powering on one of the first light source and the second light source while, at the same time, flashing on and off the other of the first light source and the second light source may be achieved by sending two PWM signals one after the other for a period of time.

The two PWM signals may have different duty cycles.

The first and the second light source may include at least one light each or an array of lights, where the first light source includes a first light having a first color, and the second light source includes a second light having a second color.

The first and second colors may be different colors, and the first and second light sources may be provided in a side-turn indicator.

Each of the first and second light sources may include at least one of a Light Emitting Diode (LED), a light bulb, a halogen lamp, an arc lamp, a Xenon arc lamp, a fluorescent lamp, a neon lamp, and an electrodeless lamp.

One or both of the at most two output channels may include a delay circuit for time delaying the output channel.

The input signal may be a PWM signal having a duty cycle rate of 20%, 80%, or 100%.

The control circuit may include at least one filter circuit to extract information from the input signal.

The input signal may include the supply voltage for at least one of the first light source or the second light source.

In a further aspect, a rear view display device for a vehicle includes the control circuit.

Further, the invention is based on the recognition that, due to a circuit design of the illumination device, it is possible to operate two circuits using only two connectors. This extends the current state of the art for monochromatic displays with all the advantages to a dichromatic display. This dichromatic display can be achieved by inverting the polarity of the two connectors. To do this, the inverse-polarity protection diodes and light-emitting diodes required per specification can be connected such that the first chromatic circle can be connected having the first connector as positive terminal (+) and the second connector as ground (−) and the second chromatic circle having the first connector as ground (−) and the second connector as positive terminal (+). It is therefore possible using the current implementation of a BSM (Blind Spot Monitoring) module having a color without changing the outer dimensions with two colors. This means that two, instead of three, pins can be used for controlling dichromatic BSM modules having same size of required space and the same pin as controlling monochromatic BSM modules.

Hereinafter, an electronic circuit for an illumination device and a driver-assistance system comprising such a circuit and a production method for such a circuit is described.

The object is achieved by an electronic circuit for a blind-spot monitoring display having a circuit carrier, having at least one first light source mounted to the circuit carrier, having at least one second light source mounted to the circuit carrier and having at least one circuit connection mounted to the circuit carrier which circuit connection is coupled to at least one of the at least one first light source and to at least one of the at least one second light source, wherein the electronic circuit comprises at least one first circuit means functionally assigned to at least one first light source and at least one second circuit means functionally assigned to at least one second light source, through which, corresponding to a voltage applied to the circuit connection, the first light source and/or the second light source can be supplied with current. The voltage applied to said circuit connection comprises an on-board voltage of a vehicle. The advantage of this is that said circuit can be used in a motor vehicle in order to serve as a blind-spot monitoring display, for example.

Furthermore, during operation, the first light source and the second light source emit light having different wavelengths. The advantage of this is that, using the electronic circuit, two independent light sources, for example of different colors, can be controlled independently of one another.

The light sources, connectors and circuit means to the circuit carrier can be mounted on the circuit carrier, beneath the mounted or also both on and beneath the circuit carrier. The circuit carrier can be a PCB (printed circuit board), for example of a pancake design or a sandwich design. The electronic components mounted to the circuit carrier can be mounted in SMD (surface-mounted devices) design, with the result that a very compact circuit is produced.

According to an embodiment of the electronic circuit, the circuit connection comprises two separate connectors.

The advantage of this is that the circuit connection can be designed in a particularly space-saving manner, if only two connectors are necessary for controlling two different light sources instead of the three connectors conventional thus far. Because the circuit connection can be connected to a remote control device via a cable, every connector for connecting the cable takes up a certain amount of installation space. In the event of only two connectors instead of three connectors, approximately 33 percent of the installation space for the circuit connection can be saved.

According to an embodiment of the electronic circuit, the first light source and the second light source comprise light-emitting diodes (LEDs). The circuit is thus economical in production and compact in design because LEDs do not occupy much space. Moreover, LEDs have very strong luminance and can be produced in different colors.

According to an embodiment of the electronic circuit, the circuit means comprise two diodes inversely switched to one another. The advantage of this is that based on a polarity of voltage applied to the diodes inversely switched to one another, the diodes inversely switched to one another can activate or block a current path. This means that the diodes are particularly suited to define two states of the electronic circuit, based on a sign of the voltage attached to the diodes.

According to an embodiment of the electronic circuit, the two diodes switched inversely to one another comprise a first inverse-polarity protection diode switched in series with the first light source and a second inverse-polarity protection diode switched in series with the second light source. The advantage of this is that the first inverse-polarity protection diode can effectively protect the first light source from voltage of an incorrect polarity being applied to the first light source, which can lead to a disruption or at least an impairment of the first light source. The same applies to the second inverse-polarity protection diode in respect of the second light source.

According to an embodiment of the electronic circuit, the two serial connections of first light source and first inverse-polarity protection diode and second light source and second inverse-polarity protection diode are switched parallel to one another. The advantage of the parallel connection is that the circuit can be divided into two parallel paths, wherein either the first path or the second path conducts current. This means that either the first light source or the second light source is activated.

According to an embodiment, the electronic circuit has a capacitance which is switched parallel to the two serial connections of first light source and first inverse-polarity protection diode and second light source and second inverse-polarity protection diode. The advantage of this is that the capacitance can store the charge state of the circuit, with the result that the circuit can also continue to be operated if voltage is no longer applied to the circuit connection, with the result that energy can be saved. The voltage thus needs to be applied to the circuit connection only briefly for example, the state of the circuit is preserved because of the capacitance. A capacitor can be used as capacitance or/and the capacitance of the line between circuit connection and electronic components of the circuit can be used as capacitance.

According to an embodiment, the electronic circuit has a connection cable which connects the two serial connections of first light source and first inverse-polarity protection diode and second light source and second inverse-polarity protection diode to the circuit connection. The advantage of such a connection cable is that it can be designed to be very compact and simultaneously can serve as capacitance.

According to an embodiment of the electronic circuit, the capacitance is formed from the connection cable. The advantage of this is that components can be saved, and the spatial requirement for the circuit is even less.

According to an embodiment of the electronic circuit, said electronic circuit comprises an electronic circuit of a blind-spot monitoring display, and/or of a route indicator, in particular of an indicator. For example, in a blind-spot monitoring display, a green light can be signaled to the driver indicating that there is no danger, while a red light can signal that there is a vehicle located in the blind spot. At the same time, the installation size required for said blind-spot monitoring display is reduced if, instead of the previously customary three connections, only two connections are necessary without impacting on the comfort of said driver. Alternatively, a previously monochromatic blind-spot display can be operated as a dichromatic blind-spot display means having the same installation size.

The object is furthermore achieved by a driver-assistance system, comprising: a control device; an electronic circuit according to the above-described aspect of the invention or an embodiment thereof; and connection means, which are designed to connect the electronic circuit to the control device, wherein the control device comprises control means which are designed, on the basis of a state of the control device, to supply to the circuit connection of the electronic circuit a voltage of a first polarity or a voltage of a second polarity.

The above-described electronic circuit can be used for the most varied applications in a driver-assistance system, for example for the blind-spot monitoring display as described above, but also for other applications. For example, the circuit can be used for an indicator in order to thus signal the intention of the driver soon he wanting to charge the lane to vehicles driving alongside or behind the driver who are located outside of the radiation angle of the front or rear indicator. The advantage of such a system is also that the control unit need not be installed together with the electronic circuit in the vehicle, but can be located at other positions, say, at any position in the vehicle where there is sufficient space. The electronic circuit can be mounted at positions suitable for the driver, such as in the exterior mirror, for example. Thus not the entire control apparatus need to be designed compact, but it is sufficient if merely the electronic circuit is designed compact.

According to an embodiment of the driver-assistance system, the state of the control device is based on a blind-spot monitoring. The advantage of this is that the control device can be used to control the electronic circuit, in order to thus realize a blind-spot monitoring system. The control device can also be reprogrammed or can be set into another state in which the electronic circuit can be used for another application. The advantage of this is that the driver-assistance system can be used flexibly for the most different applications, indeed those which are not foreseeable in the moment of integrating the driver-assistance system.

According to an embodiment of the driver-assistance system, the control device adopts a first state, when actuating an indicator, which state indicates an indicator situation and, when the indicator is switched off, adopts a second state which indicates a daytime running light situation. The advantage of this is that the driver-assistance system can carry out not only blind-spot monitoring but can also handle other situations flexibly, such as the distinction between indicating state and daytime running light state described here. The indicator can automatically switch off the daytime running light in the optical guide, and switch daytime running light back on again after indicating.

Additionally, the object is achieved by a rear-view device for a motor vehicle having at least one electronic circuit, in particular having at least one of the aforementioned features. The rear-view device can for example comprise an internal mirror or exterior mirror.

Furthermore, the object is achieved by a method for producing an electronic circuit for an illumination device, having the steps: providing a circuit carrier; mounting a first light source and a second light source to the circuit carrier; mounting a circuit connection to the circuit carrier; and mounting circuit means to the circuit carrier, in order to interconnect the first light source and the second light source and connect same to the circuit connection, wherein the circuit means switch the first light source and the second light source inversely to one another and in each case secure the same using an inverse-polarity protection diode.

A circuit for a blind-spot monitoring display can be produced particularly simply using such a method. The electronic circuit produced using this method is particularly compact and needs little installation space.

According to a further embodiment of the electronic circuit, the circuit carrier can be designed as a lead frame, i.e. as a metallic or non-metallic conduction carrier which is used for producing semiconductor chips. The leads guided out, i.e. connections of the lead frame, can form the circuit connection. The lead frame can be placed in a chip package, together with the mounted electronic components. The electronic circuit can thus be realized as a chip. With such a realization, in addition to the circuit for blind-spot monitoring, the chip can also have other functionalities or/and can control further light sources with only two connectors. For example, a chip can recognize a state not only using a polarity of the voltage at the circuit connection, but also for example recognize a phase and/or amplitude of the voltage at the circuit connection, in order thus to provide a compact monitoring unit which has a plurality of states for controlling diverse traffic situations.

In a further embodiment, first light source or first light-emitting diode and first inverse-polarity protection diode can be designed as an integrated component, for example as a light-emitting diode with integrated inverse-polarity protection. Similarly, second light source or second light-emitting diode and second inverse-polarity protection diode can be designed as an integrated component, for example as a light-emitting diode with integrated inverse-polarity protection.

Finally, the object is achieved by a motor vehicle having a rear-view device, in particular having at least one of the aforementioned features, having a driver-assistance system, in particular having at least one of the aforementioned features, and/or having an electronic circuit, in particular having at least one of the aforementioned features.

Various aspects of this invention will become apparent to those skilled in the art from the following detailed description of the preferred embodiment, when read in light of the accompanying drawings.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
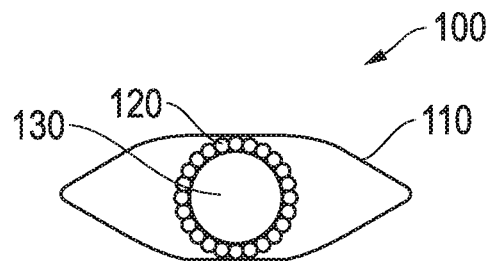
FIG. 1 is a diagram illustrating the arrangement of light passages around a camera lens that is mounted at the rear surface (seen from the driving direction) of the camera module housing.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

The terms "input channel", "first output channel", and "second output channel" can be used to refer to components of the control circuit including interfaces, where a voltage can be applied to/supplied from. Also, the term "controlling the on and off states" can be used to refer to supplying a voltage at the corresponding output channel so that the lighting device connected to the output channel will start radiating light. The term "information" can be used to refer to any information in the input voltage signal, such as voltage values, frequencies, modulated signals on the input voltage, or its waveform, etc.

Referring to the embodiments illustrated in FIGS. 1-5, an arrangement of a signaling lamp in a rear surface (seen from the driving direction) of a camera module housing is illustrated. The arrangement of the light passages could be variable in the front area of the camera module. However, in this description, the light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

FIG. 1 is a diagram illustrating the arrangement of light passages around a camera lens that is mounted at the rear surface (seen from the driving direction) of the camera module housing.

Referring to FIG. 1, the camera module 100 includes a camera module housing 110 that houses all components of the camera module 100. That is, the camera module housing 110 includes camera components and lighting components. As illustrated in FIG. 1, a plurality of light passages 120 are arranged around the periphery of a camera lens 130 and within the camera module housing 110. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 2:
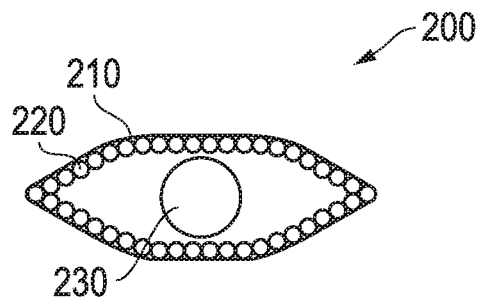
FIG. 2 is a diagram illustrating another arrangement of light passages around a camera module housing and a camera lens that is mounted at the rear surface (seen from the driving direction) of the camera module housing.

FIG. 2 is a diagram illustrating another arrangement of light passages around a camera module housing and a camera lens that is mounted at the rear surface (seen from the driving direction) of the camera module housing.

Referring to FIG. 2, the camera module 200 includes a camera module housing 210 that houses all components of the camera module 200. That is, the camera module housing 210 includes camera components and lighting components. As illustrated in FIG. 2, a plurality of light passages 220 are arranged within the periphery of the camera module housing 210 with the camera lens 230 enclosed therein. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 3:
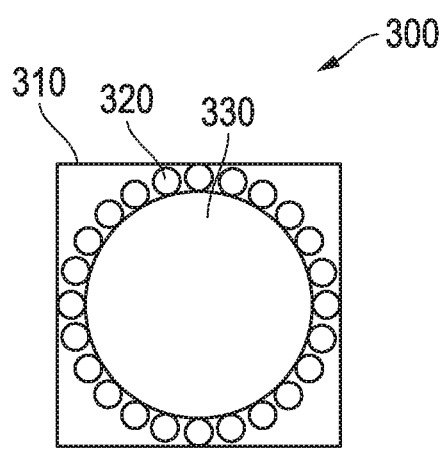
FIG. 3 is a diagram illustrating yet another arrangement of light passages around a camera lens that is mounted at the rear surface (seen from the driving direction) of the camera module housing.

FIG. 3 is a diagram illustrating yet another arrangement of light passages around a camera lens that is mounted at the rear surface (seen from the driving direction) of the camera module housing.

Referring to FIG. 3, the camera module 300 includes a camera module housing 310 that houses all components of the camera module 300. That is, the camera module housing 310 includes camera components and lighting components. As illustrated in FIG. 3, a plurality of light passages 320 are arranged around the periphery of a camera lens 330 and within the camera module housing 310. The light passages are chosen so that the light from the signaling lamp is visible from the side and behind the car and/or from the driver of the vehicle. The light passages can have essentially any shape, e.g. circular, rectangular, an icon, a freeform shape etc., and can be arranged on the surface of the camera module housing or around the lens of the camera.

Figure 4:
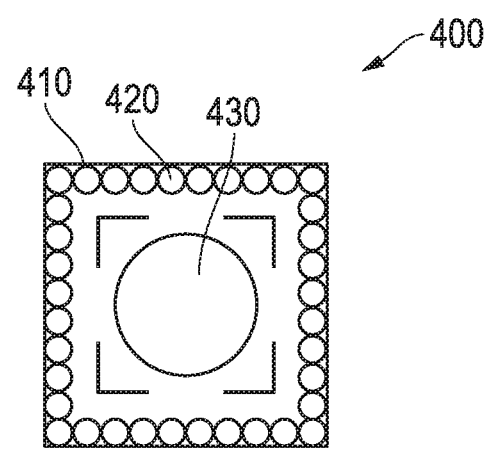
FIG. 4 is a diagram illustrating an additional arrangement of light passages around a camera module housing and a camera lens that is mounted at the rear surface (seen from the driving direction) of the camera module housing.

FIG. 4 is a diagram illustrating an additional arrangement of light passages around a camera module housing and a camera lens that is mounted at the rear surface (seen from the driving direction) of the camera module housing.

Referring to FIG. 4, the camera module 400 includes a camera module housing 410 that houses all components of the camera module 400. That is, the camera module housing 410 includes camera components and lighting components. As illustrated in FIG. 4, a plurality of light passages 420 are arranged within the periphery of the camera module housing 410 with the camera lens 430 enclosed therein. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 5:
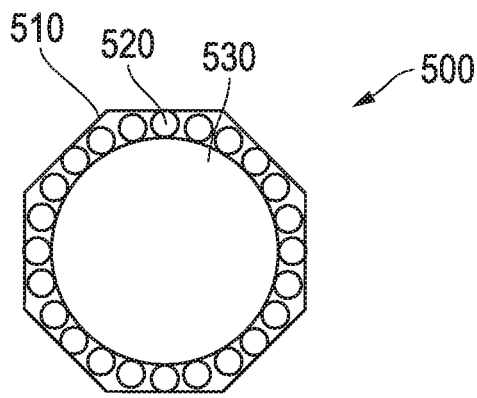
FIG. 5 is a diagram illustrating a further arrangement of light passages around a camera module housing and a camera lens that is mounted at the rear surface (seen from the driving direction) of the camera module housing.

FIG. 5 is a diagram illustrating a further arrangement of light passages around a camera module housing and a camera lens that is mounted at the rear surface (seen from the driving direction) of the camera module housing.

Referring to FIG. 5, the camera module 500 includes a camera module housing 510 that houses all components of the camera module 500. That is, the camera module housing 510 includes camera components and lighting components. As illustrated in FIG. 5, a plurality of light passages 520 are arranged within the periphery of the camera module housing 510 and around the periphery of the camera lens 530. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 6A:
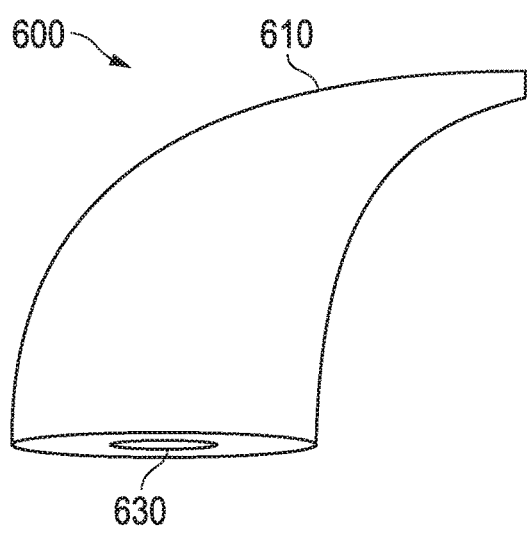
FIGS. 6A and 6B are diagrams illustrating an arrangement of an LED, light guide, and light passages in a camera module housing.
Figure 6B:
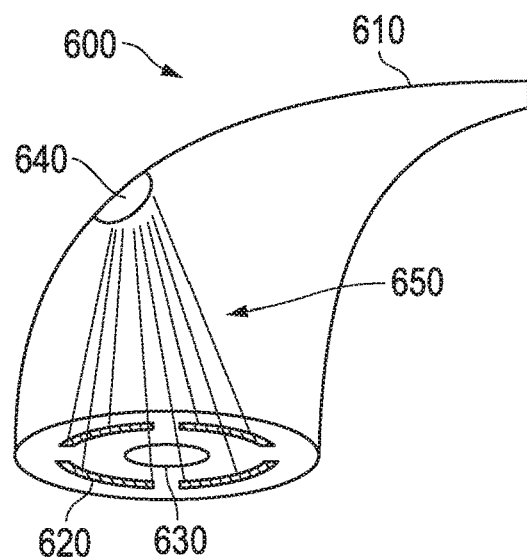

FIGS. 6A and 6B are diagrams illustrating an arrangement of an LED, light guide, and light passages in a camera module housing.

Referring to FIG. 6A, a top view of a camera module 600 including a camera module housing 610 and a camera lens 630 is illustrated. Referring to FIG. 6B, a plurality of light passages 620 are arranged around the camera lens 630 and within the camera housing 610. Also illustrated are an LED 640 and light guides 650. The light guides 650 extend from the LED to each of the light passages 620 so that the light passages 620 radiate the light provided by the LED 640. As in previous examples where the light passages are arranged on the rear surface (seen from the driving direction) of the camera module housing, here also the light passages 620 are arranged on the rear surface of the camera module housing 610.

Figure 7A:
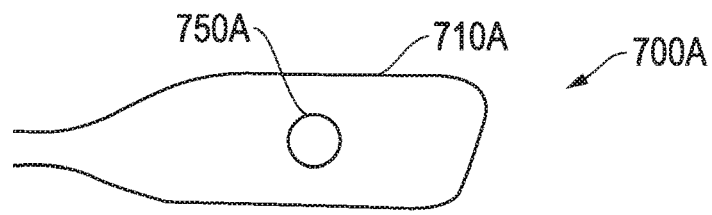
FIGS. 7A, 7B, and 7C are diagrams illustrating examples of the arrangement of a light guide on an outer surface of a camera module housing.
Figure 7B:
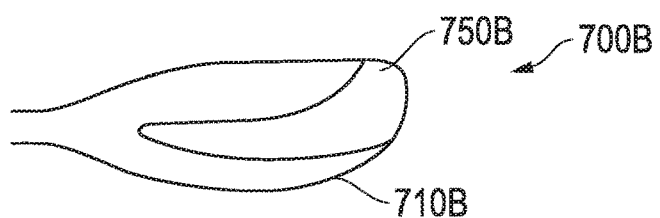
Figure 7C:
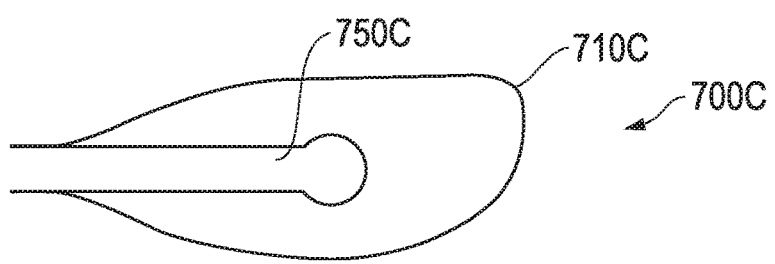

FIGS. 7A, 7B, and 7C are diagrams illustrating examples of the arrangement of a light guide on an outer surface of a camera module housing.

Referring to FIG. 7A, another example provides a light guide 750A arranged at the outer periphery of the camera module housing 710A of the camera module 700A (i.e. the part that points towards the street). The light guide 750A is arranged in the surface of the camera module housing 710A so that the light from the LED can be seen from the side and from behind the vehicle.

Referring to FIG. 7B, similar to FIG. 7A, another example provides a light guide 750B arranged at the outer periphery of the camera module housing 710B of the camera module 700B (i.e. the part that points towards the street). The light guide 750B is arranged in the surface of the camera module housing 710B so that the light from the LED can be seen from the side and from behind the vehicle.

Referring to FIG. 7C, similar to FIGS. 7A and 7B, another example provides a light guide 750C arranged at the outer periphery of the camera module housing 710C of the camera module 700C (i.e. the part that points towards the street). The light guide 750C is arranged in the surface of the camera module housing 710C so that the light from the LED can be seen from the side and from behind the vehicle.

Figure 8:
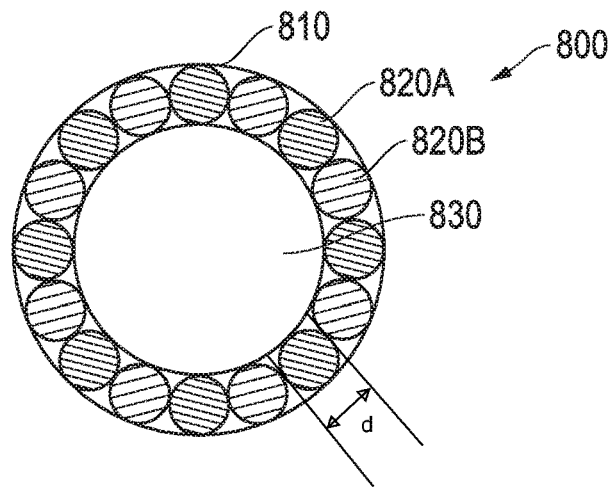
FIG. 8 is a diagram illustrating an arrangement of light passages connected to LEDs of different colors.

FIG. 8 is a diagram illustrating an arrangement of light passages connected to LEDs of different colors.

Referring to FIG. 8, another example of a camera module 800 is illustrated. In this example, the light passages 820A, 820B are arranged around a periphery of a camera lens 830 and within the boundary formed by the camera module housing 810. In this example, some of the light passages 820A are configured to receive light of a first color and some of the light passages 820B are configured to receive light of a second, different color. The signaling lamp could be used to radiate light in different colors, i.e. depending on a desired application. For example, orange light when used as indicator, red light when used as warning light for blind spot detection, and green or blue light for signaling that the car is being locked/unlocked. Still referring to FIG. 8, in an example, a diameter of any of the light passages 820A, 820B may range from 0.2 mm to 15 mm.

Figure 9A:
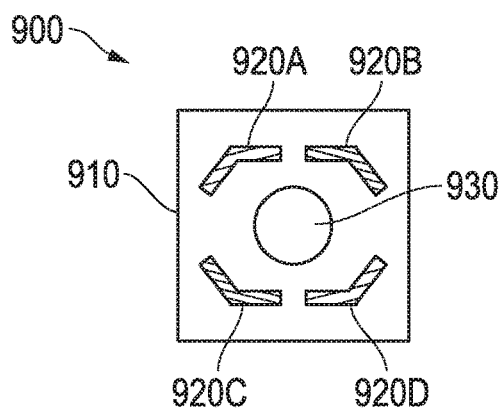
FIGS. 9A and 9B are diagrams illustrating an arrangement of light passages connected to two color LEDs.
Figure 9B:
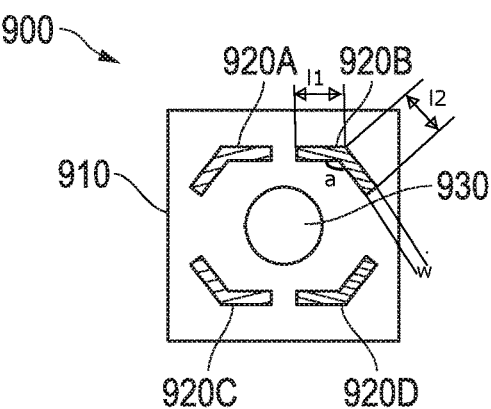

FIGS. 9A and 9B are diagrams illustrating an arrangement of light passages connected to two color LEDs.

In this example, four light passages 920A, 920B, 920C, and 920D are arranged between a camera lens 930 and the boundary formed by the camera housing 910. The camera module 900 is configured to flash according to a desired application. For example, as illustrated in FIG. 9A, at a first time period, the first light passage 920A and the fourth light passage 920D can have the same color, while the second light passage 920B and the third light passage 920C can have a second, different color. As illustrated in FIG. 9B, at a second time period, the first light passage 920A and the third light passage 920C can have the same color, while the second light passage 920B and the fourth light passage 920D can have a second, different color. Any number of iterations can be appreciated to a person having ordinary skill in the art.

Still referring to FIG. 9B, a first length l1 of any of the light passages 920A, 920B, 920C, 920D may range from 0.25 mm-17.5 mm and a second length l2 may range from 0.25 mm-17.5 mm and be different or the same such that an overall length l1 and l2 may range from 0.5 mm to 35 mm. A width w may range from 0.2 mm to 15 mm and an angle a around the lens may range from 90 degrees to 175 degrees, as illustrated in FIG. 9B.

Figure 10A:
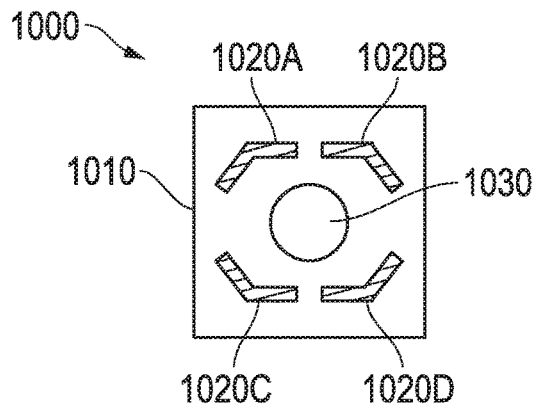
FIGS. 10A and 10B are diagrams illustrating another arrangement of light passages connected to two color LEDs.
Figure 10B:
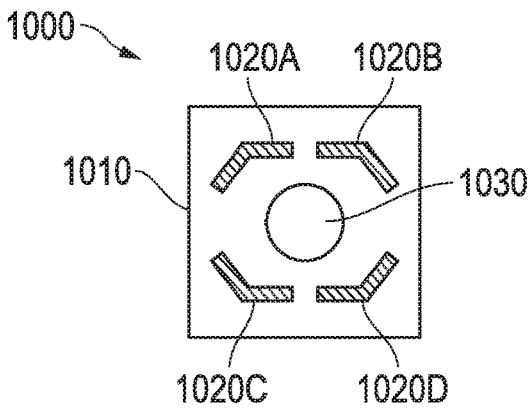

FIGS. 10A and 10B are diagrams illustrating another arrangement of light passages connected to two color LEDs.

In this example, four light passages 1020A, 1020B, 1020C, and 1020D are arranged between a camera lens 1030 and the boundary formed by the camera housing 1010. The camera module 1000 is configured to radiate a different color light according to a desired application. For example, as illustrated in FIG. 10A, at a first time period, all light passages 1020A-D can have the same first color. As illustrated in FIG. 10B, at a second time period, all light passages 1020A-D can have a second, different color. Any number of iterations can be appreciated to a person having ordinary skill in the art.

In another example, the camera module may include a signal lamp having only a single light source, for example a first light source, that is adapted to radiate light having a first color and a second color the first color being different from the second color. Such a light source may include a multi-color LED or any other light source that is adapted to radiate light having more than one color.

Figure 11:
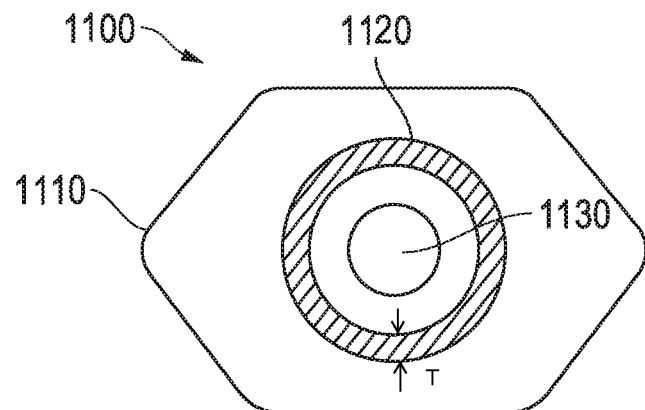
FIG. 11 is a diagram illustrating a single light passage arranged on a camera module housing.

Further, the camera module may include a single opening for example, but not limited to, a circle formed around the circumference of the camera lens. Referring to FIG. 11, a single light passage 1120 is arranged between a camera lens 1130 and the boundary formed by the camera module housing 1110. A thickness T of the light passage 1120 may, for example, range from 0.2 mm to 15 mm along the entire circumference of the light passage 1120. The camera module 1100 is configured to radiate different color light according to a desired application and in accordance with the examples described in this application. Any number of iterations can be appreciated to a person having ordinary skill in the art.

Figure 12:
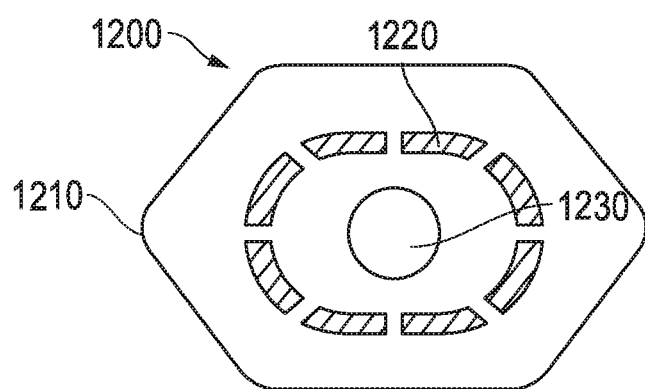
FIG. 12 is a diagram illustrating a plurality of light passages arranged on a camera module housing.

FIG. 12 is a diagram illustrating another example of a camera module 1200. In this example, a plurality of openings 1120 are arranged in an oval configuration around the camera lens 1230 and within a boundary formed by the camera module housing 1210. The camera module 1200 is configured to radiate different color light according to a desired application and in accordance with the examples described in this application. Any number of iterations can be appreciated to a person having ordinary skill in the art.

Figure 13:
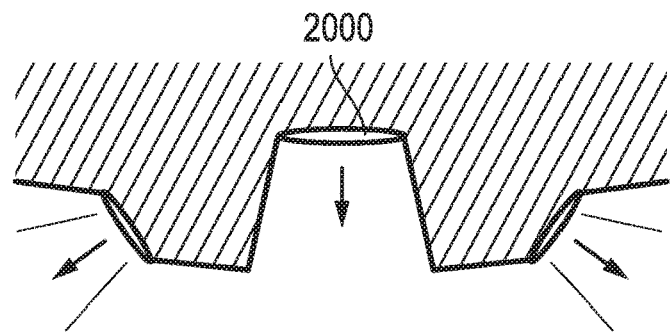
FIG. 13 is a diagram illustrating a first example of isolating a signal of a light source by alignment of the light source.

In addition, a number of different examples may be applied for isolating the light source and the light radiated by the light source from the camera. FIG. 13 is a diagram illustrating a first example of isolating a signal of a light source by alignment of the light source at an angle with the camera 2000. In this example, the light source and the light emitted is arranged and radiated at an angle for isolation of the light.

Figure 14:
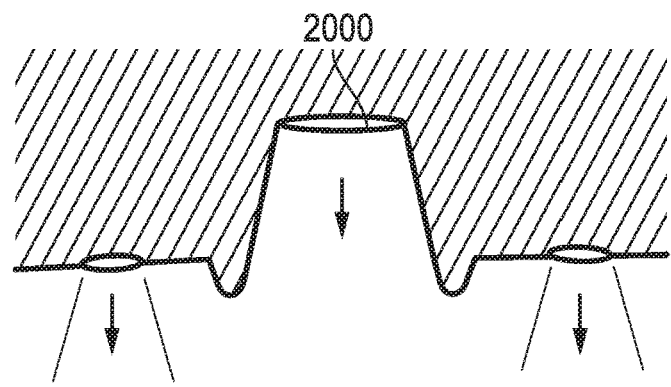
FIG. 14 is a diagram illustrating a second example of isolating a signal of a light source by including the light source as an integrated part of the camera module.

FIG. 14 is a diagram illustrating a second example of isolating a signal of a light source by including the light source as an integrated part of the camera 2000. In this example, the light source may include a bar, for example as illustrated in the drawing, which is integrated with the camera 2000.

Figure 15:
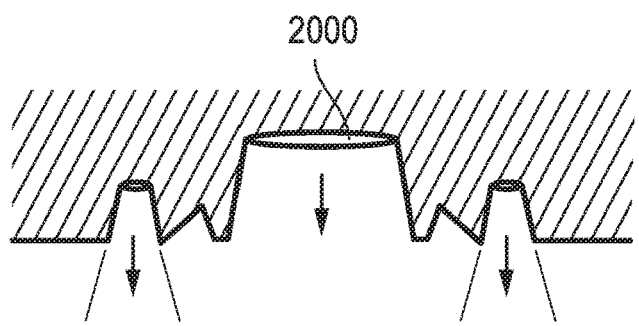
FIG. 15 is a diagram illustrating a third example of isolating a signal of a light source by including the light source in a slot of the camera module.

FIG. 15 is a diagram illustrating a third example of isolating a signal of a light source by including the light source in a slot of the camera module. In this example, the light source may be integrated in the camera module and in a slot that is positioned adjacent to the camera 2000 for isolating the light source and the radiated light from the camera 2000.

Figure 16:
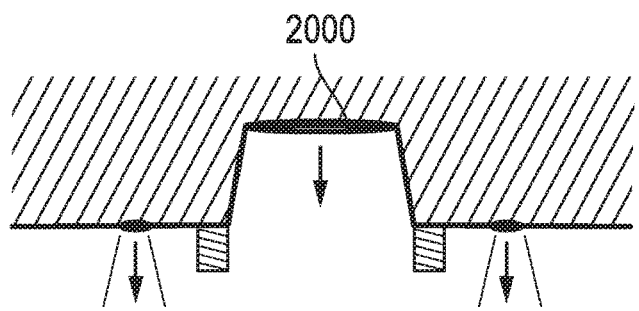
FIG. 16 is a diagram illustrating a fourth example of isolating a signal of a light source by including the light source as an attached part.

FIG. 16 is a diagram illustrating a fourth example of isolating a signal of a light source by including a separating bar, chrome ring, or some other isolating feature as an attached part. In this example, the attachable bar can be a different material that is attached adjacent to the camera 2000 and outside the camera module, as illustrated in the drawings.

According to these examples and the examples provided throughout the application, the light source may be isolated from the camera 2000 so that a signal from the light source does not interfere with an input of the camera 2000. Also, a signal of the light source is configured to be recognized by the driver but does not interfere with an input of the camera 2000.

It should be appreciated that specific colors of light are radiated for specific functions. For example, an orange light may be radiated for a turn light, a red or magenta light may be radiated for a blind spot indication, a yellow or light yellow light may be emitted for notifying that an item was forgotten in the vehicle such as a key or a smartphone, a yellow or dark yellow light for object detection warning, a purple light for a welcome, a green light for ambiance, among different examples of different colored lights for different applications. It should be appreciated that the color of the light and application is not limited to the examples provided herein. It is appreciated that several colors are legally restricted in certain jurisdictions such as blue or white forward light.

Figure 17:
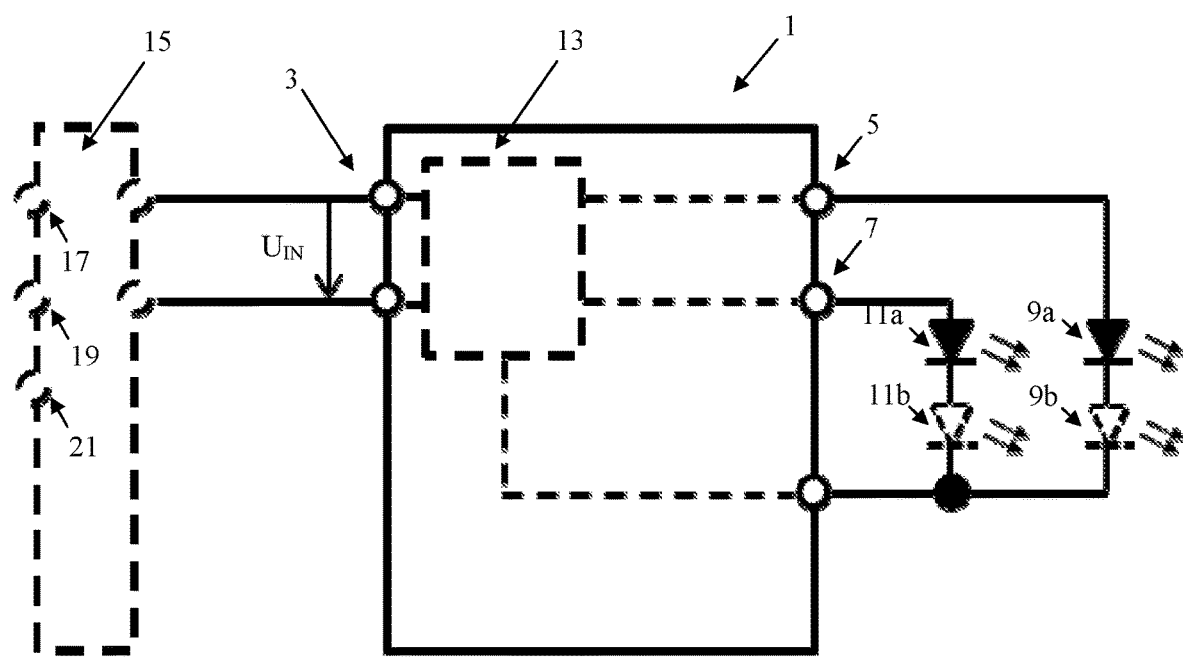
FIG. 17 is a diagram illustrating an example of a schematic view of a control circuit and a monitoring circuit.

FIG. 17 is a diagram illustrating an example of a schematic view of a control circuit and a monitoring circuit.

Referring to FIG. 17, the control circuit 1 for controlling a lighting application in a vehicle includes a voltage input channel 3 for receiving an input voltage $U_{IN}$, and a first output channel 5 and a second output channel 7. From FIG. 17, it can be seen that the first and second lighting devices comprise light sources 9a, 9b, 11a, 11b and are connected to the output channels 5, 7. In the shown example, two light sources 9a, 9b, 11 a, 11b are connected to each output channel 5, 7. However, the skilled person would know that in embodiments of the invention only one single light sources 9a, 11 a could be connected to each output channel 5, 7. Therefore, the second light sources 9b, 11b are shown with dotted lines.

Also shown with dotted lines is a filter circuit 13 that can be used in some embodiments of the invention to extract the first information and the second information from the input voltage $U_{IN}$. Depending on the first information and the second information, the first output channel 5 is adapted to control the on and off states of the first lighting device light sources 9a, 9b connected thereto, and the second output channel 7 is adapted to control the on and off states of the second lighting device light sources 11a, 11b connected thereto. The skilled person would know that the filter circuit 13 could comprise two transistor to switch between the lighting devices, i.e. depending on the input voltage $U_{IN}$.

FIG. 17 also illustrates a monitoring circuit 15 that could be connected in some embodiments to the control circuit 1 and which could be adapted to supply the input voltage $U_{IN}$ to the control circuit 1. As it is exemplarily shown in FIG. 17, the monitoring circuit 15 could comprise various interfaces, e.g. a first interface 17 for connecting a RFID receiver, a second interface 19 for connecting a GPS receiver, and a third interface 21 for connecting an Onboard Diagnostic System. The skilled person should appreciate, however, that the monitoring circuit 15 could also comprise just one of the above mentioned interfaces, and that the input voltage $U_{IN}$, i.e. the first and second information, is generated based on signals on the interfaces 17, 19, 21. Here, it should be appreciated by a person having ordinary skill in the art that the monitoring circuit 15 could be comprised in a Electronic Control Unit, ECU.

Figure 18:
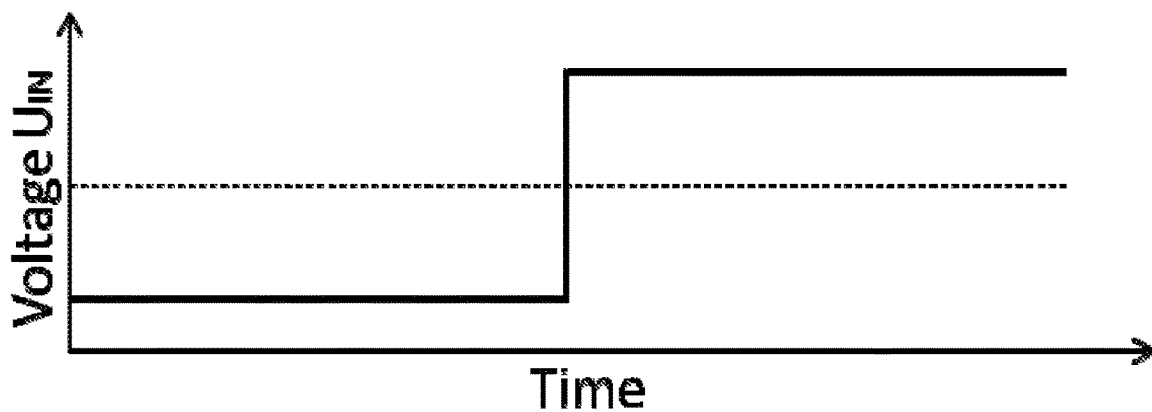
FIG. 18 is a diagram illustrating an example of a schematic voltage versus time diagram of an input voltage.

FIG. 18 illustrates a schematic voltage versus time diagram of an input voltage $U_{IN}$ according to a first embodiment of the invention. In the figure, a dotted line is used to indicate the threshold, or threshold voltage. As it can be seen from the figure, the voltage remains at a level below the threshold for some period of time. By measuring the input voltage $U_{IN}$ it can be determined that the first information is conveyed by the input voltage $U_{IN}$, because the input voltage $U_{IN}$ is below the threshold. In that case, the first output channel turns on the first lighting device, and the second output channel turns off the second lighting device, or keeps the second lighting device turned off. When the input voltage $U_{IN}$ raises above the threshold, the first output channel turns the first lighting device off, and the second output channel turns the second lighting device on, i.e. for as long as the input voltage $U_{IN}$ is above the threshold.

Figure 19:
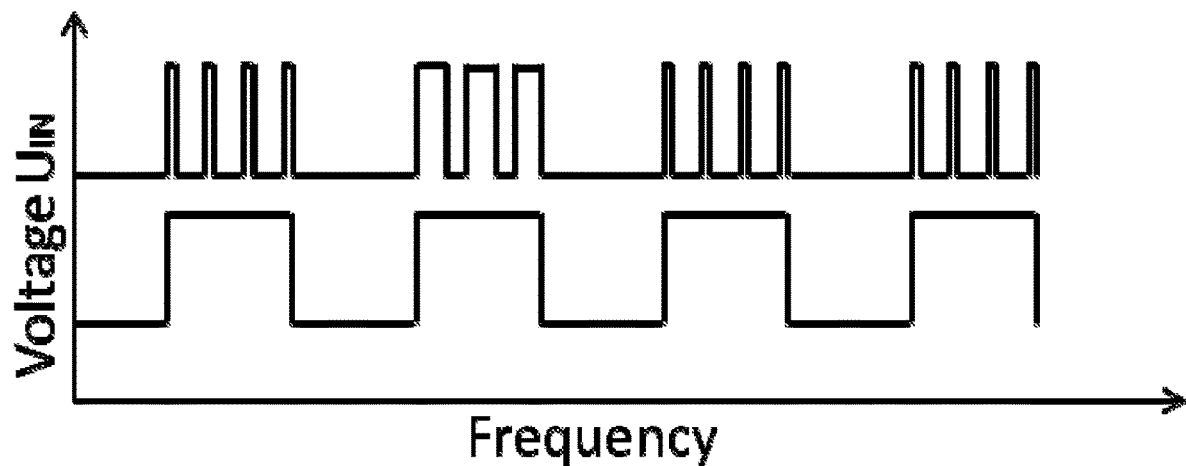
FIG. 19 is a diagram illustrating another example of a schematic voltage versus frequency diagram of an input voltage.

FIG. 19 shows a schematic voltage versus frequency diagram of an input voltage according to a second embodiment of the invention. Here, on the top of the diagram, the input voltage $U_{IN}$ is shown as pulsed input voltage alternating between high and low, e.g. on and off, respectively. The frequency could be, for example, in the region of 1 Hz. On the bottom of the diagram a duty cycle rate is exemplarily shown. In the context of this invention, the term "duty cycle" is used to define the percentage of one period in which the input voltage $U_{IN}$ is high, or switched on, respectively. In the first, third and fourth periods that are exemplarily shown in FIG. 19, the duty cycle might be 20%, and hence might allow the determination that the first information is conveyed in the input voltage $U_{IN}$. In the second period that is exemplarily shown in FIG. 19, the duty cycle might be 50%, and hence might allow the determination that the second information is conveyed in the input voltage $U_{IN}$.

Figure 20:
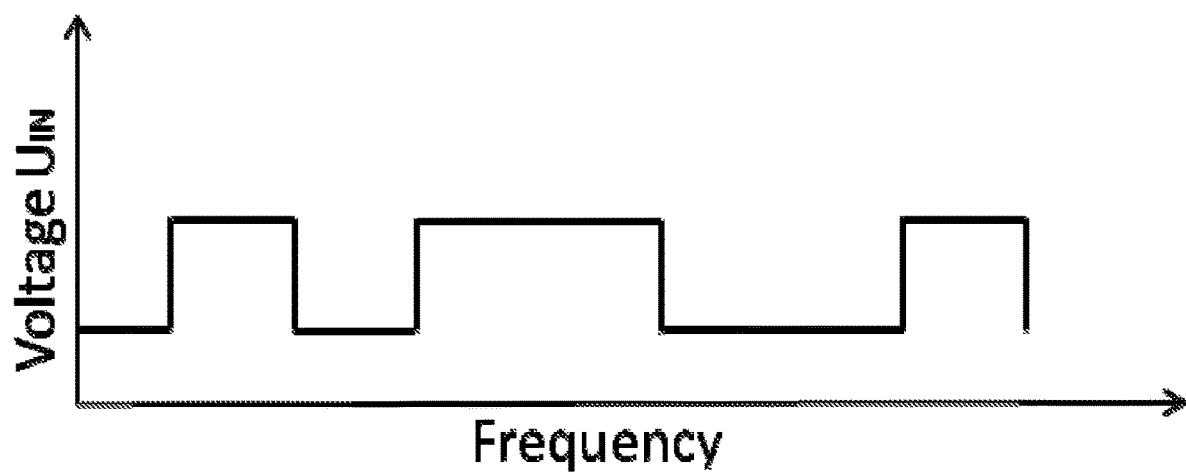
FIG. 20 is a diagram illustrating yet another example of a schematic voltage versus frequency diagram of an input voltage.

FIG. 20 illustrates a schematic voltage versus frequency diagram of an input voltage according to a third embodiment of the invention. Here, it is exemplarily shown that the first and third periods have a higher frequency than the second period. Therefore, determining the higher and/or lower frequency allows to determine that either the first and/or the second information is conveyed.

Figure 21:
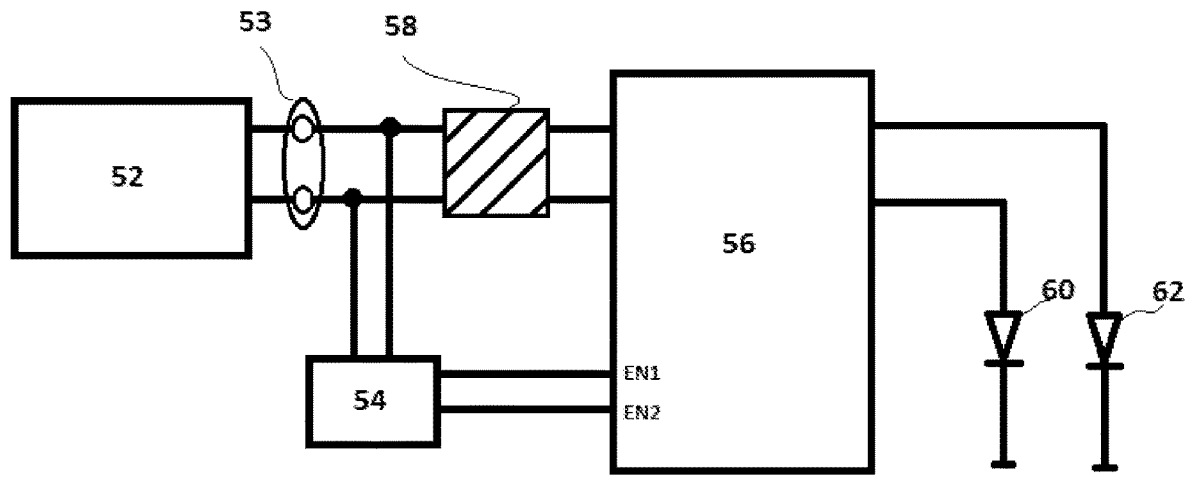
FIG. 21 is a diagram illustrating an example of a control circuit for controlling at least two light sources at the same time.

FIG. 21 illustrates a monitoring circuit or Electronic Control Unit (ECU) 52 that may be connected to a control circuit and is adapted to supply a pulse width modulation (PWM) signal thereto. The control circuit is adapted to convert different PWM signals to power on and off one or more light sources. As shown in FIG. 21, the control circuit may include a connector 53 which connects the ECU 52 to the control circuit, a filter 54, a PWM processor 58, and an LED driver 56. The control circuit may be connected to at least a first light source 62 and a second light source 64. As described above in reference with FIG. 17, the monitoring circuit or ECU 52 may contain one or more interfaces for interfacing with systems of the vehicle.

Still referring to FIG. 21, a PWM signal is initially supplied by the ECU 52. In an example, the LED driver 56 is enabled via the filter 54 to clear an input. Whether an input is cleared can depend on the duty cycle of the transmitted PWM signal. For example, the duty cycle may range from 0 to 100% and includes a duty cycle of at least 0, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at most 100%, at most 95%, at most 90%, at most 85%, at most 80%, at most 75%, at most 70%, at most 65%, at most 60%, at most 55%, at most 50%, at most 45%, at most 40%, at most 35%, at most 30%, at most 25%, at most 20%, at most 15%, at most 10%, and at most 5%. The cleared input may determine which, if any, of the first or second light sources are powered on or off.

Figure 22:
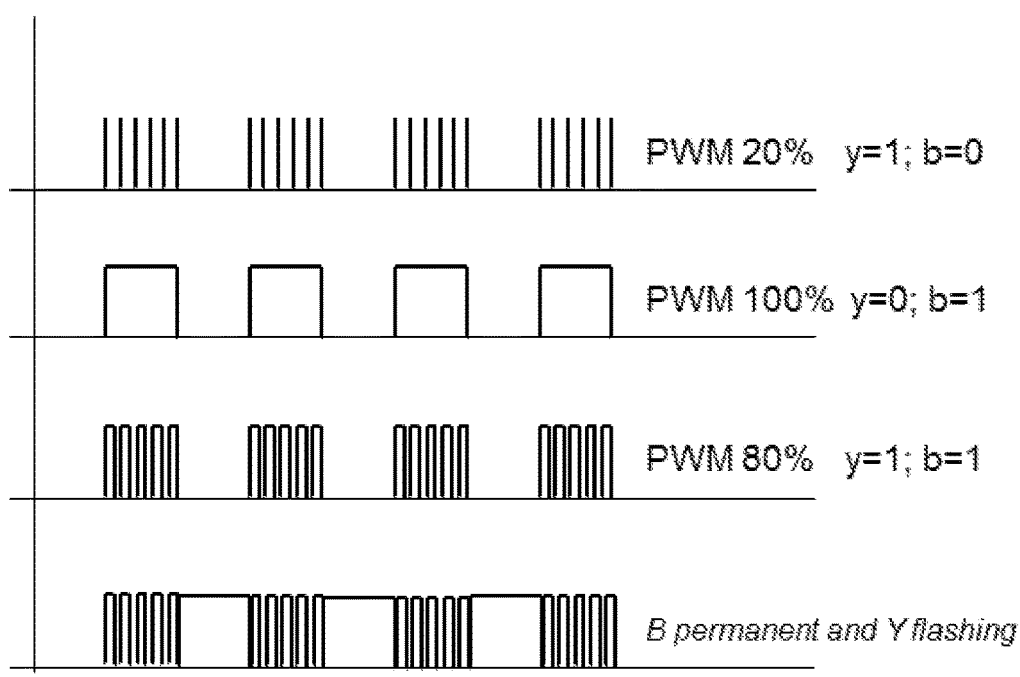
FIG. 22 is a diagram illustrating a schematic voltage versus time diagram of an input voltage according to a number of examples.

FIG. 22 is a diagram illustrating a schematic voltage versus time diagram of an input voltage according to a number of examples. As shown in FIG. 22, a PWM signal being transmitted controls the operation of the first light source 62 and the second light source 64. In this example, the first light source 62 is a yellow light and the second light source 64 is a blue light. According to the example illustrated in FIG. 22, if the ECU 52 transmits a PWM signal with a 20% duty cycle, the LED driver 56 is enabled via the filter 54 to clear an input. In this case, when the input is cleared, the yellow LED 62 is switched on, as shown on the first line of FIG. 22. In response to a PWM signal with a duty cycle of 100%, the blue LED 64 may be unlocked via the filter 54, as shown on the second line of FIG. 22. To power on both LEDs 62, 64, a PWM signal with a duty cycle of 80% is transmitted to clear both inputs, as shown on the third line of FIG. 22.

On the fourth line of FIG. 22, with only two lines connected to the ECU 52, the ECU 52 is adapted to control the first and second light sources 62, 64 so that one light is flashing while the other light is permanently on. In this case, the flashing light may be the yellow light which is functioning as a turn signal, and the permanent light may be the blue light which is functioning as an autonomous vehicle indicator. The ECU 52 may alternate from 80% PWM to 100% PWM in the frequency of a turn signal. As a result, the light switches between blue and yellow on at the same time (80% PWM) to only blue on (100% PWN). In other words, blue is permanently activated, while yellow is flashing. In an aspect, the cost savings of providing only two cables which allow for more versatile coding and control provide an advantage of a more compact and cost-effective solution.

Referring still to FIGS. 21 and 22, the ECU 52 sends a signal of PWM 20% alternately, then filter circuit 54 picks up this frequency and enables the correct LED to switch on. In one example, LED 60 is yellow and LED 62 blue. As discussed, if the desired result is y=1 to flash normally, then a PWM 20% signal is alternately transmitted in the usual flashing frequency and the filter then switches over the EN1, thus the yellow LED is clear.

In response to PWM 100%, then the LED 62 is activated via the filter, i.e. to turn on the blue light. This can be either permanent or flashing depending on how the signal is transmitted. At PWM 80%, both ENs are enabled. As a result, both blue and yellow light up. However, in order to blink yellow and turn on blue permanently, the signal from the filter 52 is alternately sent with PWM 80% and 100% as shown in FIG. 22. As a result, EN2 is enabled once at PWM 100% and thus blue light is turned on, and once both ENs are enabled, thus yellow and blue light are turned on. This results in permanent blue light and flashing yellow light.

The first light source may be used as a turn signal and the second light source may be used to mark an autonomous vehicle; however, each light source may be used for a number of different functions as described throughout this application and known to a person of ordinary skill in the art. While a first light source and second light source is described, each of the first light source and the second light source may include a plurality of lights. Also, the colors of the lights are not limited to the examples described herein, nor are the specific PWM values limited to those described herein.

Figure 23:
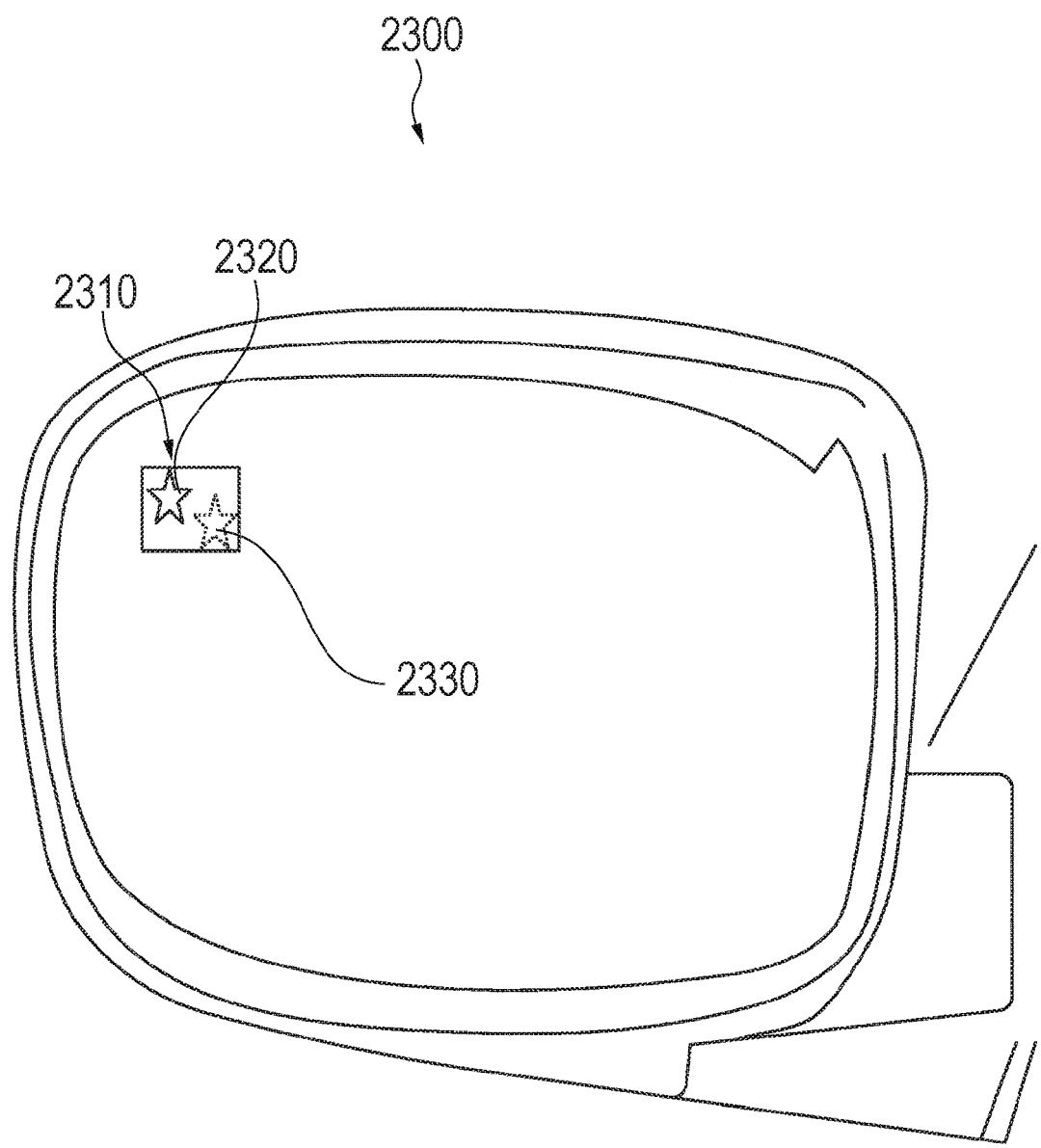
FIG. 23 is a schematic representation of an example of a vehicle exterior mirror having an integrated electronic circuit for a blind-spot monitoring display.

Additionally, embodiments of external vehicle light sources may be utilized in driving-assistance systems, such as blind-spot monitoring. Turning to FIG. 23, an embodiment of a schematic representation of a vehicle exterior mirror 2300 having an integrated electronic circuit 2310 for a blind-spot monitoring display is shown. The electronic circuit 2310 includes two light sources 2320, 2330, represented by two stars which can be switched on or off alternately, for example by a control apparatus. The two light sources 2320, 2330 will be referred to throughout as first light sources, and specifically, a primary first light source and a secondary first light source. It should be appreciated that the terms primary and secondary do not indicate that one light source is more significant or critical than another. The control apparatus can be placed in the boot of the vehicle, as described in more detail in FIG. 26. The two light sources may be light-emitting diodes (LEDs). The electronic circuit 2310 is described in more detail below in reference with FIGS. 24A and 24B.

The electronic circuit 2310 includes a circuit connection having two connectors, i.e. connectors to which a cable can be attached, as well as circuit means which make possible an alternate switching-on of the primary first light source 2320 and the secondary first light source 2330. This means that either the primary first light source 2320 lights up, for example, in a first color such as green, or the secondary first light source 2330 lights up, for example, in a second color such as red. The representation of FIG. 23 shows the circuit 2310 in the state in which the primary first light source 2320 is lit up (e.g. in green) and the secondary first light source 2330 is switched off. This can display the "green" state, i.e. the blind-spot monitoring signals that no other vehicle is located in the blind spot of the actual vehicle. If the circuit 2310 changes to a "red" state, i.e. the blind-spot monitoring signals that another vehicle is located in the blind spot of the actual vehicle, the secondary first light source 2330 (e.g. in red) lights up and the primary first light source 2320 is switched off. Because of the special circuit arrangement, as described in more detail in FIG. 24, this dichromatic monitoring with a circuit connection which requires only two connectors is possible.

Figure 24A:
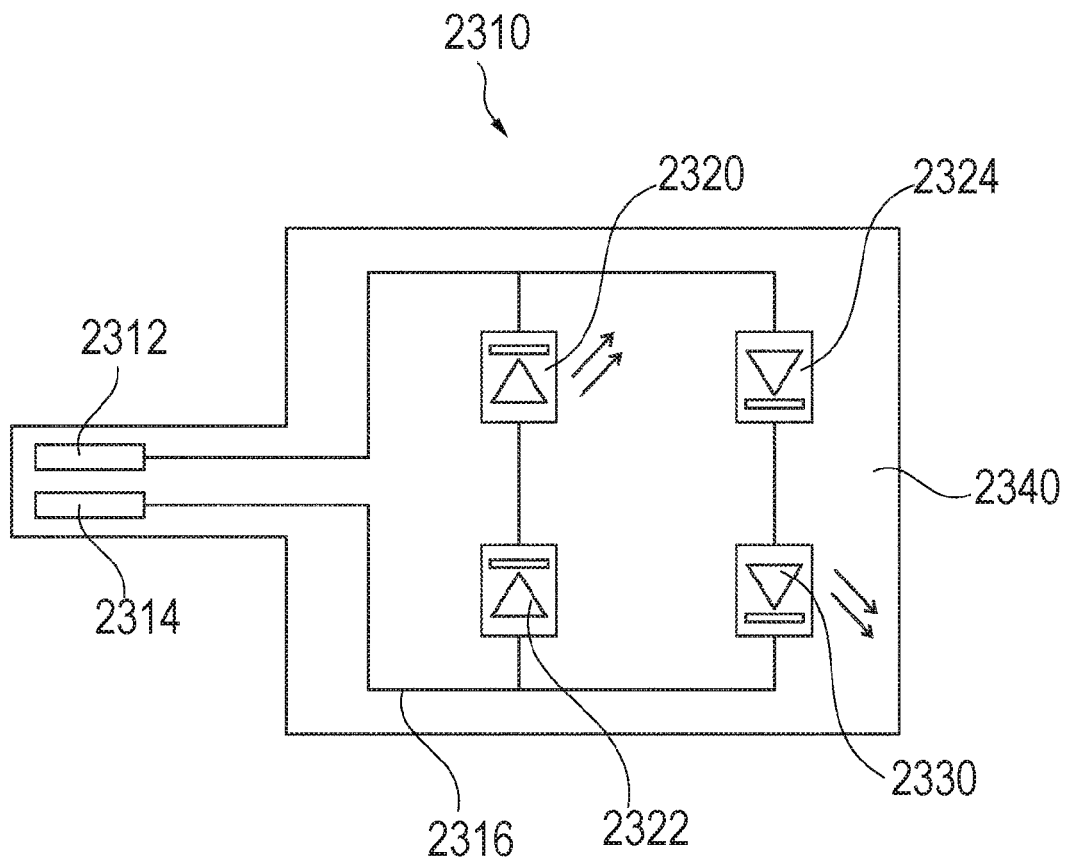
FIG. 24A is a schematic representation of a top view of an example of an electronic circuit for a rearview lighting module such as a blind-spot monitoring display.

Referring to FIG. 24A, a schematic representation of an electronic circuit 2310 for a blind-spot monitoring display is illustrated. The circuit 2310 includes a circuit carrier 2340, a primary first light source 2320 mounted to the circuit carrier 2340, a secondary first light source 2330 mounted to the circuit carrier 2340 as well as a circuit connection mounted to the circuit carrier 2340 having two separate connectors 2312, 2314 coupled to the primary first 2320 and secondary first 2330 light sources via electronic interconnection.

The electronic circuit 2310 includes circuit means in the form of an electrical line or connection cable 2316 as well as a first diode 2322, for example an inverse-polarity protection diode, and a second diode 2324, for example an inverse-polarity protection diode. A polarity of a voltage is applied to the circuit connection 2312, 2314 to supply either the primary first light source 2320 or the secondary first light source 2330 with current. This can be guaranteed by means of the inverse interconnection of the two diodes 2322, 2324. If, for example, there is a positive voltage between the first connector 2312 and the second connector 2314, then current may flow through the second diode 2324 and the secondary first light source 2330 while no current flows through the first diode 2322 and the primary first light source 2320. In the case of reversed polarity of the voltage applied, on the other hand, current flows through the first diode 2322 and the primary first light source 2320 while no current flows through the second diode 2324 and the secondary first light source 2330; the circuit is in the state represented in FIG. 23.

The two light sources 2320, 2330 can be designed as diodes which have different colors.

The two diodes 2322, 2324 switched inversely to one another include a first inverse-polarity protection diode 2322 switched in series with the primary first light source 2320 and a second inverse-polarity protection diode 2324 switched in series with the secondary first light source 2330, as can be seen from FIG. 24A. The two serial connections of the primary first light source 2320 and the first inverse-polarity protection diode 2322, and of the secondary first light source 2330 and the second inverse-polarity protection diode 2324, are switched parallel to one another as illustrated in FIG. 24A. The connection cable 2316 serves to connect the two serial connections of primary first light source 2320 and first inverse-polarity protection diode 2322 and secondary first light source 2330 and second inverse-polarity protection diode 2324 to the circuit connection 2312, 2314, i.e. to the two connectors 2312, 2314.

Furthermore, the electronic circuit 2310 can have a capacitance which is switched parallel to the two serial connections of the primary first light source 2320 and the first inverse-polarity protection diode 2322, and the secondary first light source 2330 and the second inverse-polarity protection diode 2324. A capacitance of a capacitor component is not represented in FIG. 24A; however, the capacitance can be formed from the capacitance of the connection cable 2316.

The voltage applied to the two connectors 2312, 2314 can be an on-board voltage of a motor vehicle. The electronic circuit can thus be used in the automotive field.

Figure 24B:
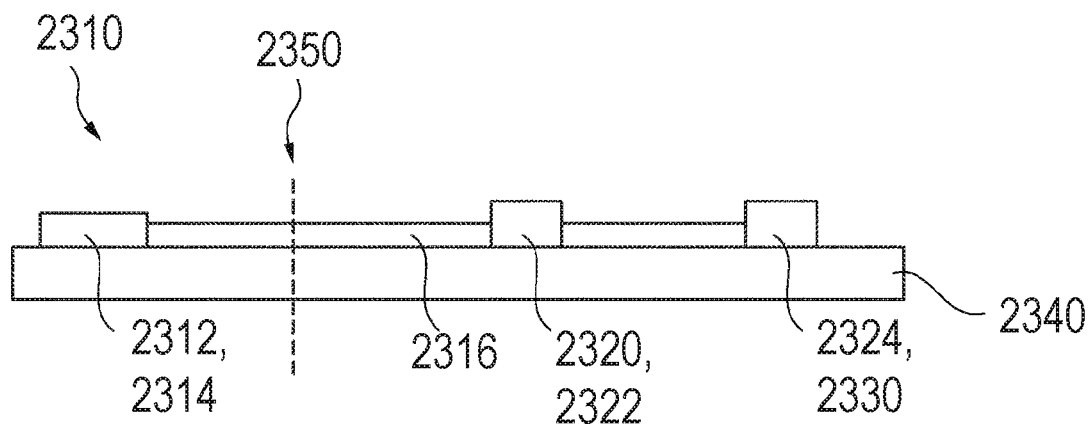
FIG. 24B is a schematic representation of a side view of an example of the electronic circuit of FIG. 24A.

FIG. 24B shows a side view of a schematic representation of the electronic circuit 2310 from FIG. 24A. The components, including a primary first light source 2320 and a secondary first light source 2330, a first inverse-polarity protection diode 2322 and a second inverse-polarity protection diode 2324, and a connection cable 2316 can be mounted on the circuit carrier 2340 in a pancake design. The circuit carrier 2340 can be a flexible circuit carrier which is made in one piece. For example, the circuit carrier 2340 and thus the circuit 2310 can have a flexible or rigid bending edge 2350 with the result that the part of the circuit 2310 with the two connectors 2312, 2314 is arranged at an angle, e.g. approximately perpendicular to the part of the circuit 2310 with the two light sources 2320, 2330 and the two diodes 2322, 2324. This can be advantageous for connecting the circuit 2310 more simply or arranging the connections of the circuit not visible in the mirror 2300 according to the representation of FIG. 23. The circuit 2310 may also include additional electronic components.

Figure 25:
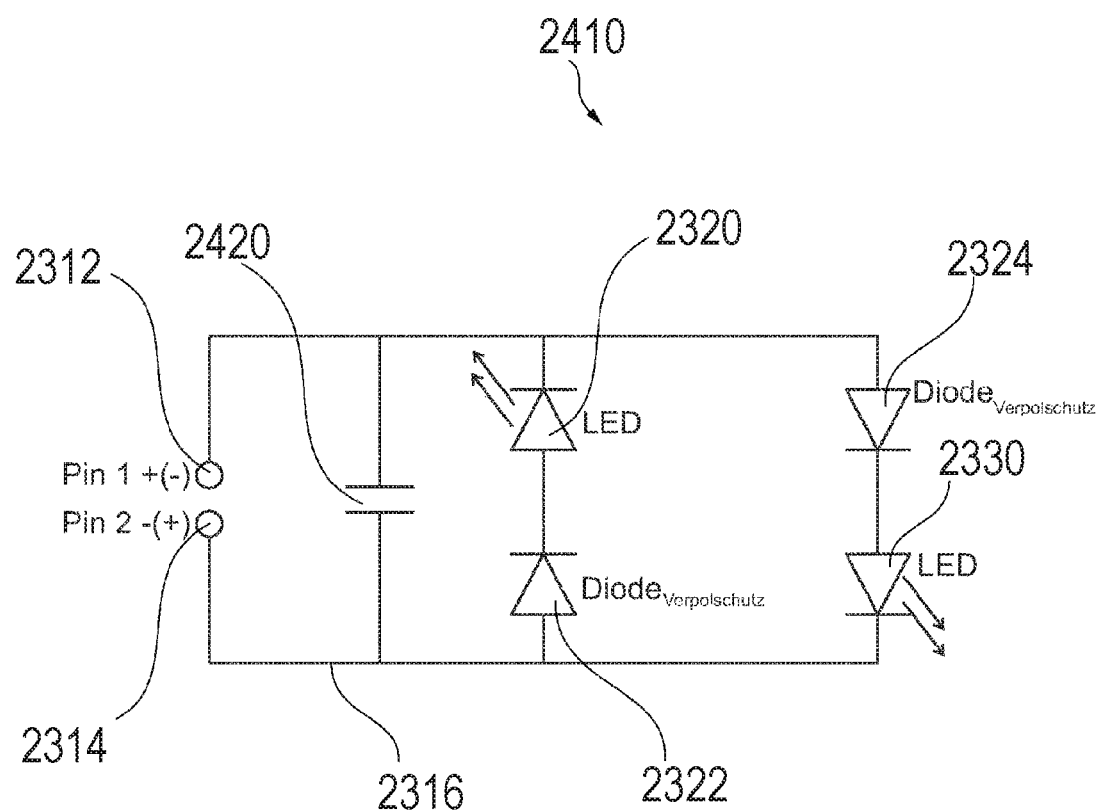
FIG. 25 is a circuit diagram of an electronic circuit for a rearview lighting module such as a blind-spot monitoring display according to the examples of FIGS. 24A and 24B.

FIG. 25 shows a circuit diagram of an electronic circuit 2410 for a blind-spot monitoring display according to an embodiment.

The circuit 2410 includes two circuit branches, each having a light-emitting diode (LED) 2320, 2330 and inverse-polarity protection diode 2322, 2324 arranged upstream. The inverse-polarity protection diode is intended to prevent voltage of reversed polarity from reaching respective LEDs 2320, 2330. Both circuit branches are switched parallel to one another at a circuit connection having a first connector 2312 for connection to a voltage of a first polarity and a second connector 2314 for connection to a voltage of a second polarity. Furthermore, the circuit 2410 includes a capacitor 2420 which is switched parallel to both circuit branches likewise to the two connectors 2312, 2314.

In a first state of the circuit 2410, the first polarity can be positive (+) and, for example, correspond to the positive terminal of a car battery. The second polarity can be negative (−) and, for example, correspond to the negative terminal or the ground of a car battery. In a second state of the circuit 2410, the two terminals can be swapped, i.e. the first polarity can be negative (−) and correspond to the negative terminal or ground of a car battery and the second polarity can be positive (+) and correspond to the positive terminal of a car battery. The capacitor 2420 can serve to store a charge state of the circuit 2410. The circuit 2410 can be produced on any circuit carrier, with the result that, for example, a circuit 2310 can be produced as described in FIGS. 24A and 24B. The capacitor 2420 can be achieved by the line 2316 or can be produced as an individual component. The circuit 2410 can, of course, also include further electronic components.

Referring to FIGS. 24A, 24B, and 25, and also referring back to FIGS. 17 and 21, the electronic circuits 2310, 2410 including the primary first light source 2320 and the secondary first light source 2330 may be connected to a first output channel 5 and/or a second output channel 7 of a control circuit such as control circuit 1 of FIG. 17 or the circuit of ECU 52 of FIG. 21. For example, a single electronic circuit 2310 may be provided which is connected to one or the other of the first output channel 5 or the second output channel 7. In this case, for example, the one or more first light sources 9a, 9b of the first output channel 5 may correspond to a primary first light source 2320 and a secondary first light source 2330. For ease of illustration, an example circuit having this configuration will be described in the paragraph below in reference with FIG. 31A. In another example, the one or more second light sources 11a, 11b of the second output channel 7 may correspond to a primary second light source and a secondary second light source. As a result, four different light sources having four different wavelengths may be provided when two electronic circuits 2310 are connected to the first output channel 5 and the second output channel 7. For ease of illustration, an example circuit having this configuration will be described in the paragraph below in reference with FIG. 31B. The light sources at the first output channel 5 may be referred to as the primary first light source 2320a and the secondary first light source 2330a, and the light sources at the second output channel 7 may be referred to as the primary second light source 2320b and the secondary second light source 2330b.

Figure 31A:
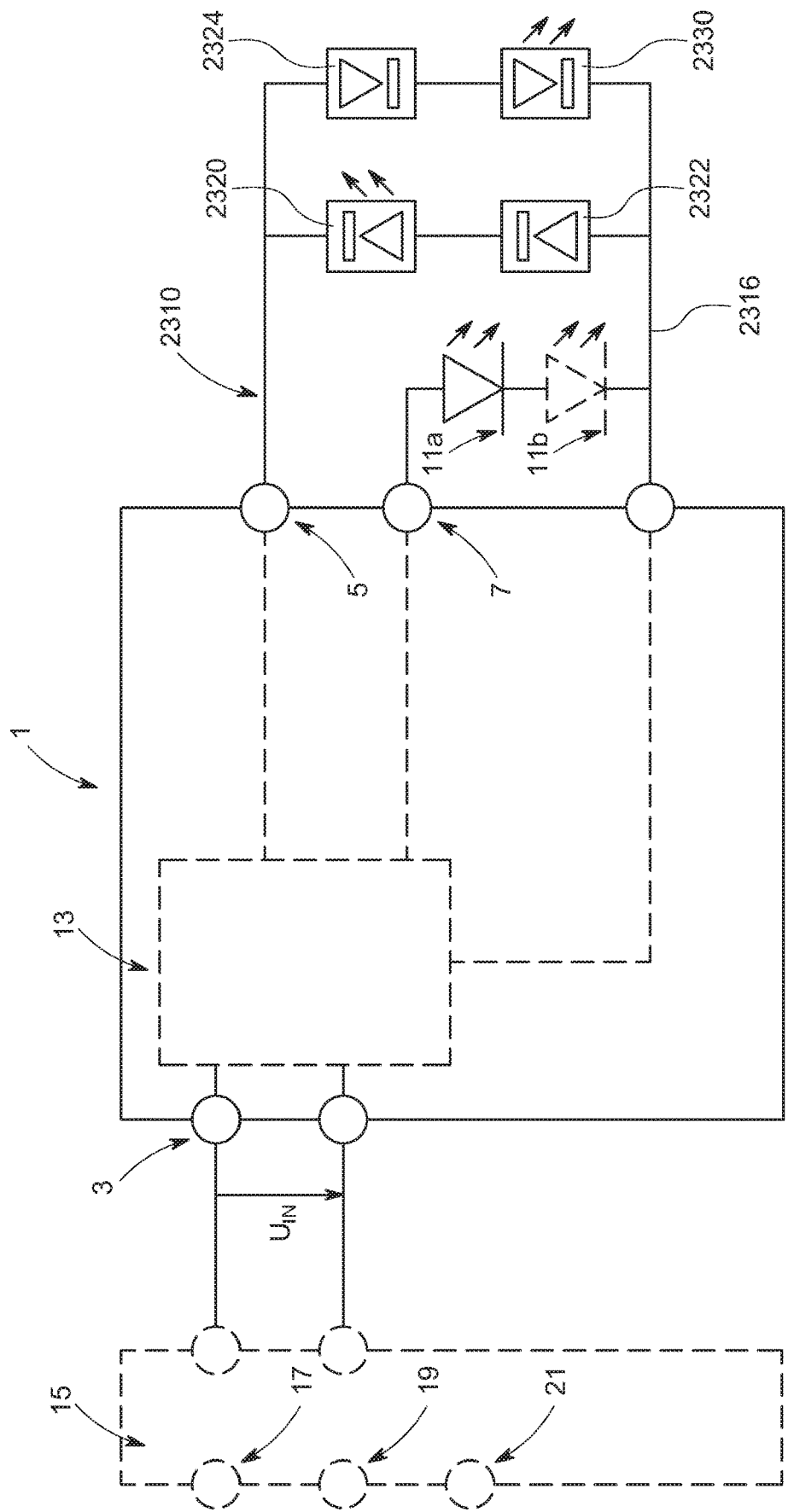
FIG. 31A is a diagram illustrating another example of a schematic view of a control circuit and a monitoring circuit.
Figure 31B:
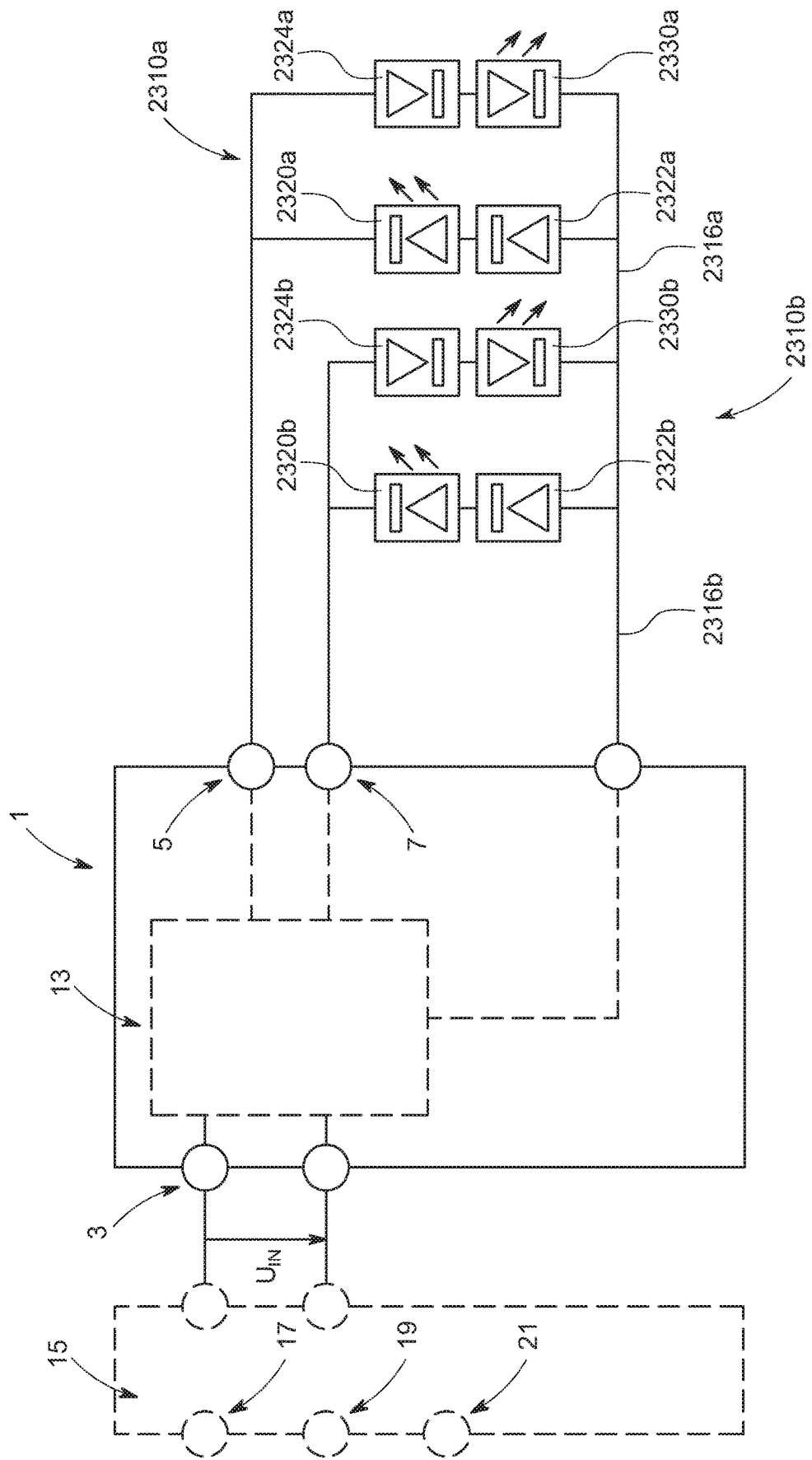
FIG. 31B is a diagram illustrating a further example of a schematic view of a control circuit and a monitoring circuit.

FIGS. 31A and 31B are diagrams illustrating examples of schematic views of a control circuit and a monitoring circuit. In both examples, a control circuit 1 for controlling a lighting application in a vehicle includes a voltage input channel 3 for receiving an input voltage $U_{IN}$, a first output channel 5, and a second output channel 7. Other features of the control circuit 1 and monitoring circuit 15 are the same as the control circuit 1 of FIG. 17 including the interfaces 17, 19, 21, and the filter circuit 13. Referring to FIG. 31A, an electronic circuit 2310 in line with the circuit of FIG. 21 is connected to output channel 5, including a primary first light source 2320, a secondary first light source 2330, two diodes 2322, 2324, e.g. inverse-polarity protection diodes, and circuit means or connection cable 2316. In this example, the one or more second light sources 11a, 11b of the second output channel 7 have the same configuration as the circuit of FIG. 17. Referring to FIG. 31B, two electronic circuits 2310a, 2310b in line with the circuit of FIG. 21 are connected to both output channels 5, 7, including a primary first light source 2320, a secondary first light source 2330, a primary second light source 2320b, a secondary second light source 2330b, four diodes 2322a, 2324a, 2322b, 2324b, e.g. inverse-polarity protection diodes, and circuit means or connection cable 2316a, 2316b. While FIGS. 31A and 31B illustrate using one or more circuits 2310 as shown in FIG. 24A, it should be appreciated that the circuit 2410 including the capacitor 2420 of FIG. 25 can be used instead for one or both of the channels 5. 7.

Figure 26:
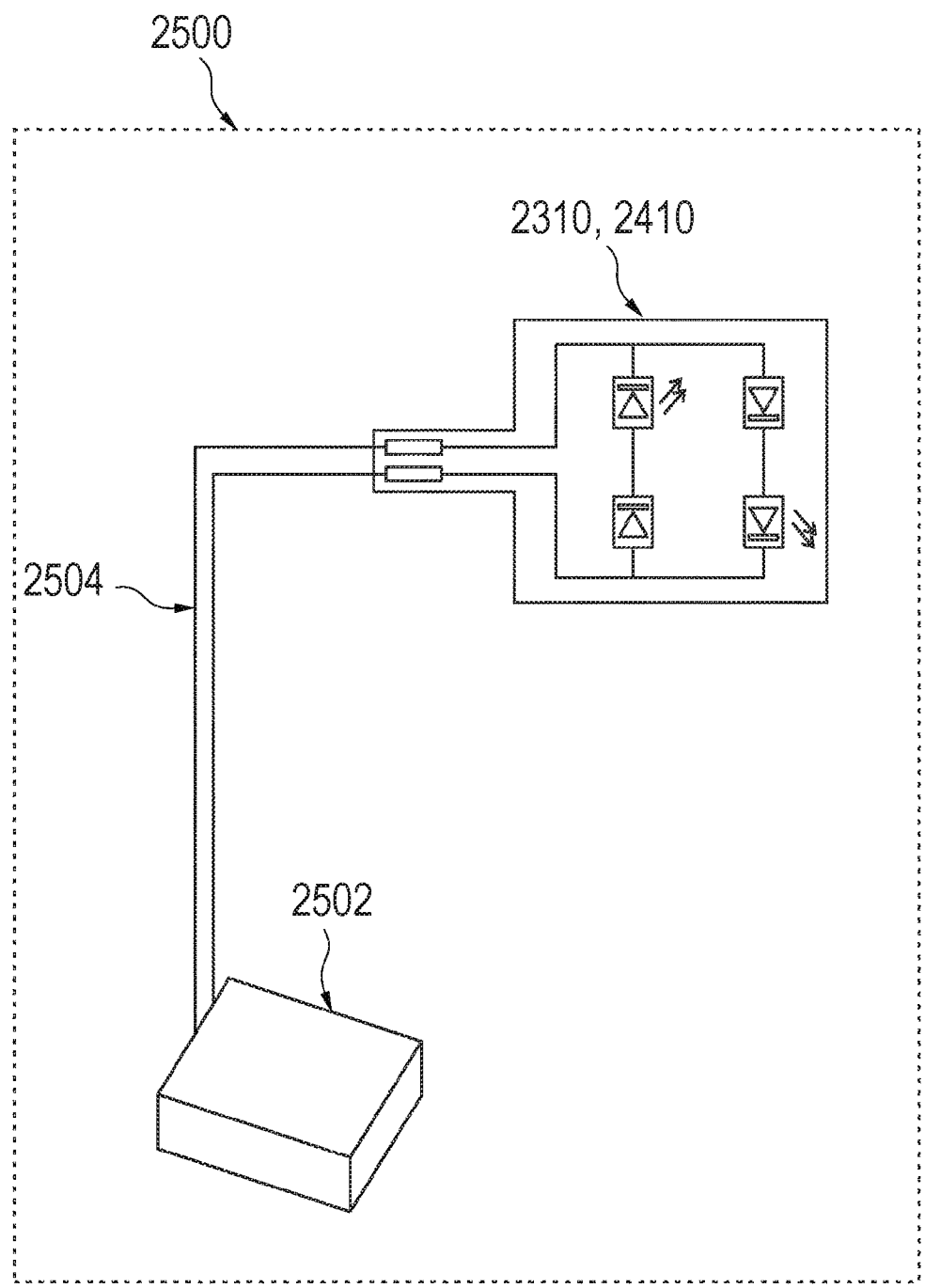
FIG. 26 is a schematic representation of an example of a driver-assistance system.
Figure 27A:
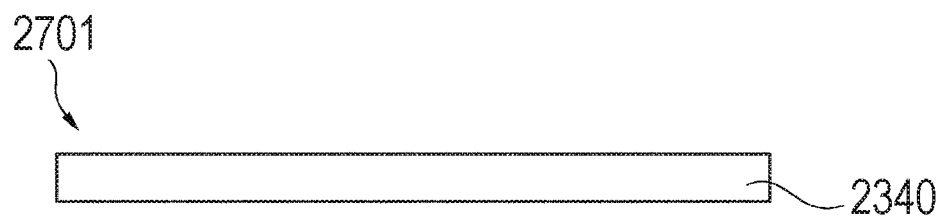
FIGS. 27A, 27B, 27C, and 27D are schematic representations of an example of a method for producing an electronic circuit for a rearview lighting module such as a blind-spot monitoring display.
Figure 27B:
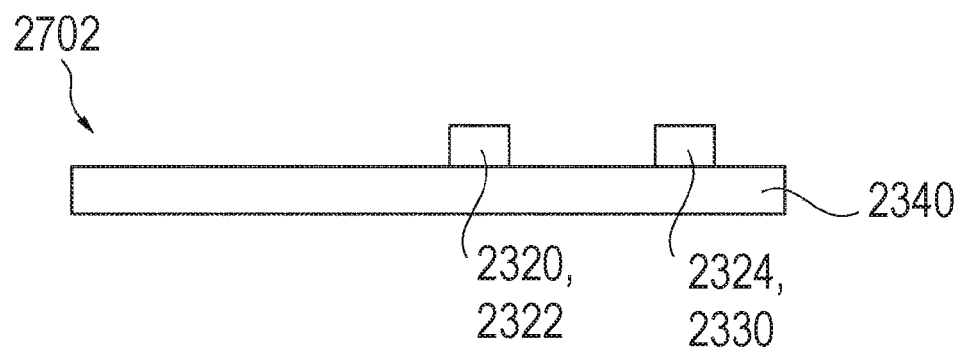
Figure 27C:
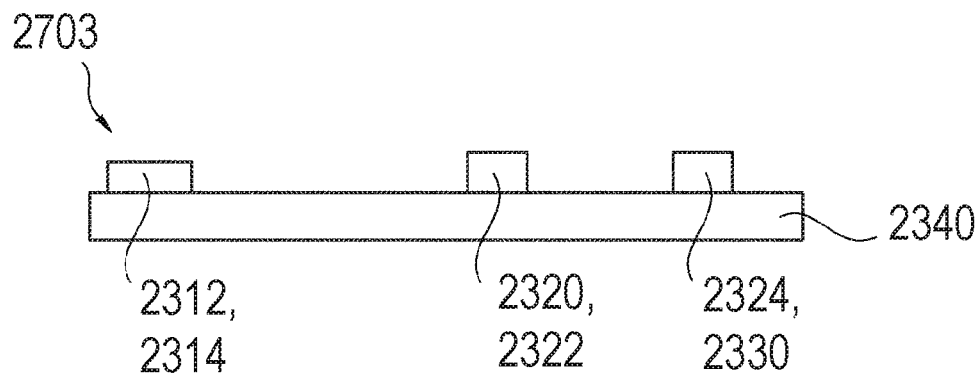
Figure 27D:
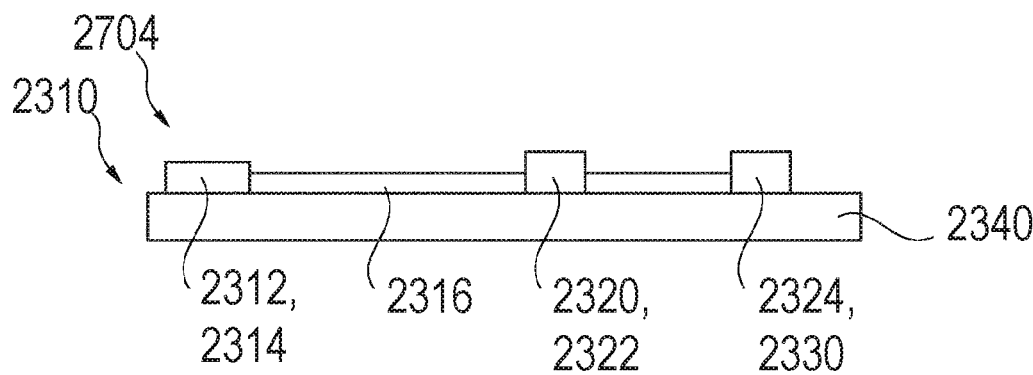

FIG. 26 shows a schematic representation of a driver-assistance system 2500 according to an embodiment. The driver-assistance system includes a control device 2502, a connection cable 2504 and an electronic circuit 2310, 2410, for example, as described above with reference to FIGS. 24 and 25. The connection cable 2504 serves as connection means in order to connect the electronic circuit 2310, 2410 to the control device 2502. The control device 2502 includes control means through which a voltage of a first polarity or a voltage of a second polarity can be supplied to the circuit connection 2312, 2314 of the electronic circuit 2310, 2410 using a state of the control device 2502. Therefore, it is possible to activate the primary and secondary light sources alternately with the result being that, depending on the state of the control device 2502, the driver can be shown a green first LED indicating that no vehicle is located in the blind spot and a red second LED indicating that a vehicle is located in the blind spot. The control device 2502 can be located at a suitable position in the vehicle where sufficient space is available and where the electronics can be shielded against disruptive influences. The electronic circuit 2310, 2410 can also be located directly in a position which is suitable and visible for the driver, for example, in the exterior mirror 2300 behind the surface of the mirror, as shown in FIG. 23. For the connection cable or the connection line 2504, a two-wire cable, which is conventional in the automotive field, can be used because the circuit 2310, 2410 can be controlled using only two connectors 2312, 2314.

The state of the control device 2502 can be based not only on a blind-spot monitoring but can also include other driving situations. Thus, the control device 2502 can, for example, adopt a first state when actuating an indicator which indicates an indicator situation and when switching off the indicator adopts a second state which indicates a daylight driving situation.

FIGS. 27A to 27D show schematic representations of a method 2701, 2702, 2703, 2704 for producing an electronic circuit 2310 for a blind-spot monitoring display according to an embodiment.

The method can include a first step 2701 in which a circuit carrier 2340 is provided, such as described above in reference with FIG. 24. The method can include a second step 2702 in which a primary first light source 2320, e.g. an LED of a first color, and a secondary first light source 2330, e.g. an LED of a second color, can be mounted to the circuit carrier 2340. The method can include a third step 2703 in which a circuit connection having two connectors 2312, 2314 can be mounted to the circuit carrier 2340. The method can include a fourth step 2704 in which circuit means, for example a connection cable 2316 and two diodes 2322, 2324, e.g. inverse-polarity protection diodes, can be mounted to the circuit carrier 2340. Accordingly, the circuit means may be provided in order to interconnect the primary first light source 2320 and the secondary first light source 2330 and connect same to the circuit connection 2312, 2314. The circuit means 2316, 2322, 2324 can be mounted to the circuit carrier 2340 such that the primary first light source 2320 and the second light source 2330 are switched inversely to one another and are each secured using an inverse-polarity protection diode (2322, 2324). The production method can produce a circuit 2310, as described above in reference with FIG. 23. The individual method steps can also be carried out in any other suitable order.

A further aspect of the invention includes a computer program product which can be loaded directly into the internal memory of a digital computer and comprises software code segments, with which the method steps 2701, 2702, 2703 and 2704 of the method described in FIG. 27 can be executed if the product runs on a computer. The computer program product can be stored on a computer-suitable medium and can include, the following: computer-readable programming means which prompt a computer to execute the method according to the description provided in reference with FIG. 27. The computer can be a part of a computer-controlled production machine with which a computer-controlled production can be realized.

A further aspect includes a computer program product which can be loaded directly into the internal memory of a digital computer and includes software code segments with which a control of the electronic circuit 2310, 2410 as described in FIGS. 24 and 25 can be executed if the product runs on a computer. The computer program product can be stored on a computer-suitable medium and can include a computer-readable program which prompts a control device 2502, as described above with reference to FIG. 26, using a state of the control device 2502 to supply a voltage of a first polarity or a voltage of a second polarity to charge the circuit connection 2312, 2314 of the electronic circuit 2310, 2410. The computer can be part of the control device or the control device can represent the computer.

As described above, there is a need to provide for a compact circuit arrangement for embodiments of the lighting modules detailed herein. Therefore, it is a further aspect of the invention to provide for electronic circuit arrangements for rearview device lighting modules having only two input wires, as described in reference to FIGS. 28-30 below.

Figure 28:
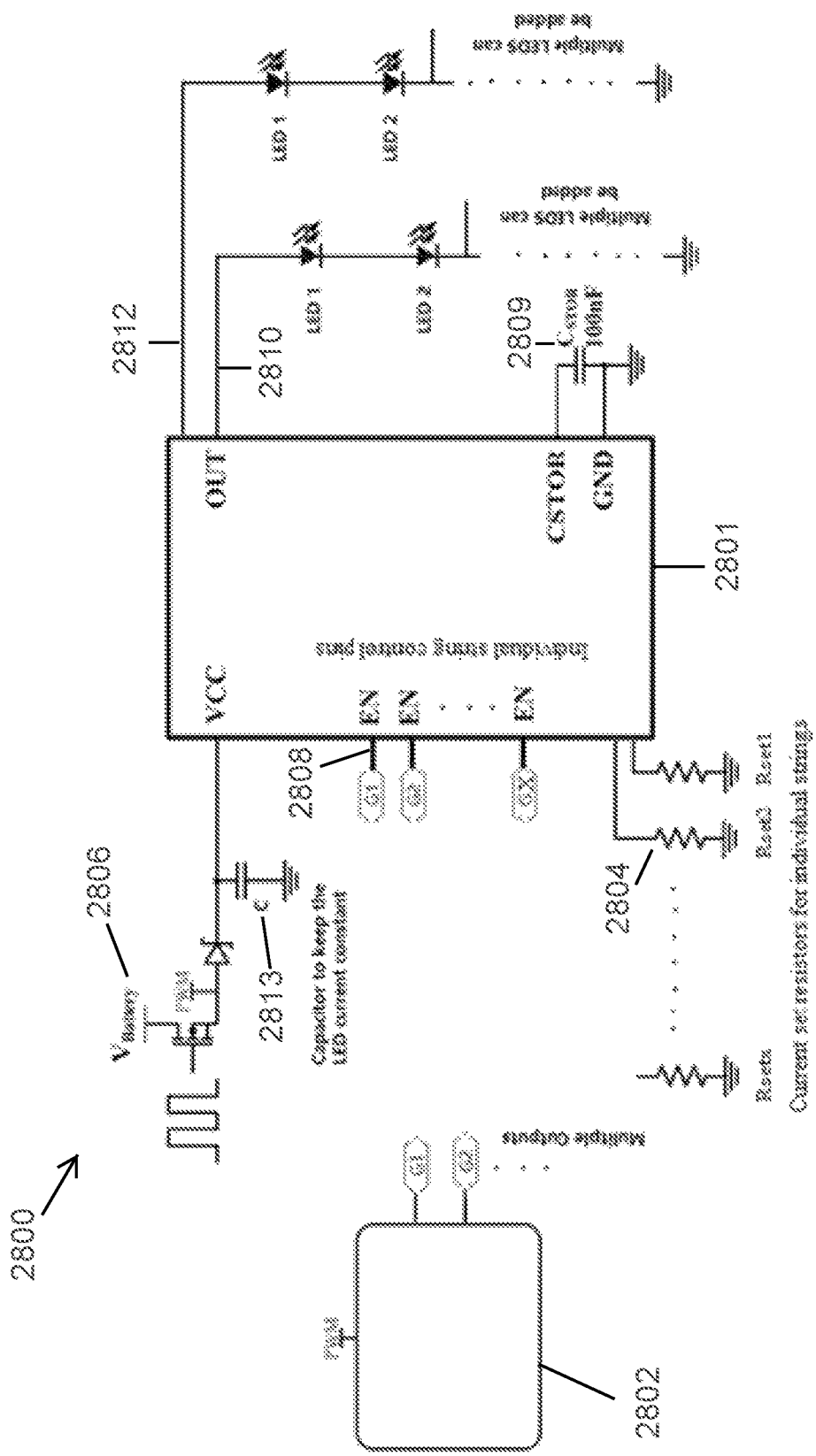
FIG. 28 is a circuit diagram of an example of an electronic circuit for a rearview device lighting module having only two input wires.
Figure 29:
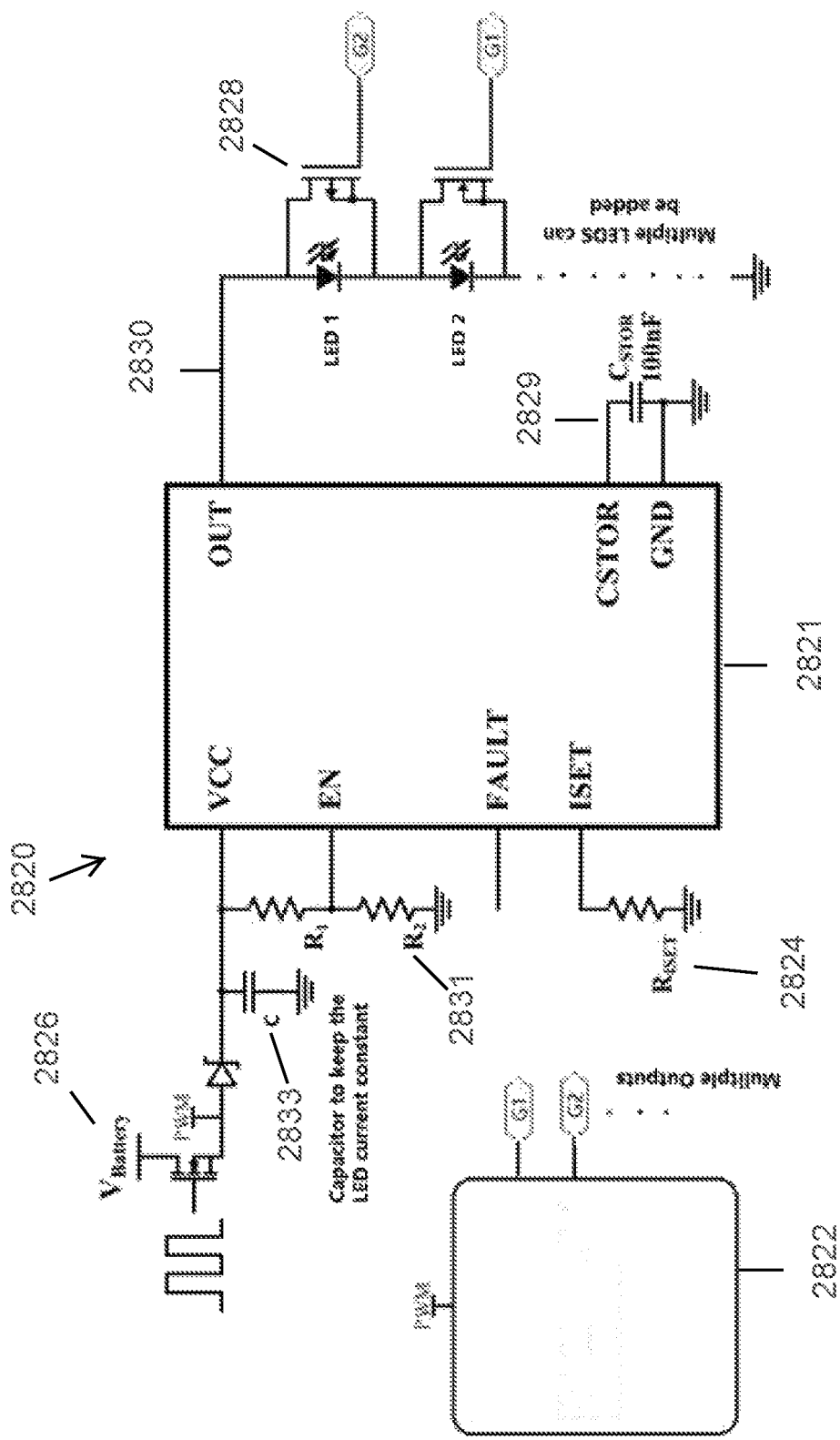
FIG. 29 is a circuit diagram of another example of an electronic circuit for a rearview device lighting module having only two input wires.
Figure 30:
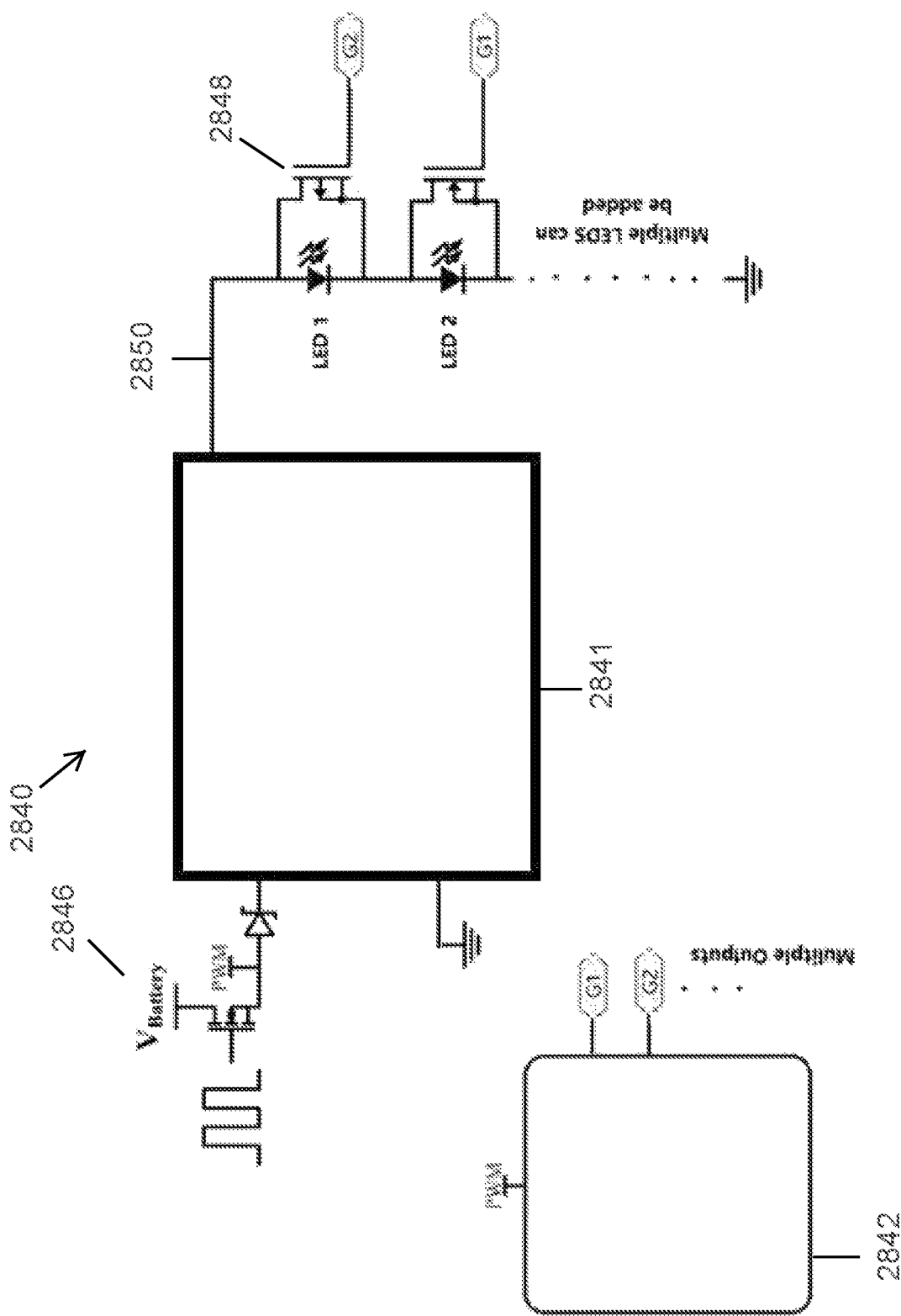
FIG. 30 is a circuit diagram of an additional example of an electronic circuit for a rearview device lighting module having only two input wires.

According to the examples of FIGS. 28-30, only two input wires are connected to a printed circuit board, and an input pulse-width modulation signal is changed according to a desired output for controlling the LEDs or LED strings. The input pulse-width modulation signal is detected by a filter circuit and, in turn, determines which of the respective LEDs or LED strings are turned on.

FIG. 28 is a circuit diagram of an example of an electronic circuit 2800 for a rearview device lighting module having only two input wires.

Referring to FIG. 28, an electronic circuit 2800 includes a filter circuit 2802 with one or more outputs G1, G2, and an LED driver integrated circuit 2801 with one or more current set resistors 2804, a power source 2806, one or more enable pins 2808, a capacitor 2809 for ground, a capacitor 2813 for keeping the LED current constant, and one or more LED strings 2810, 2812 with one or more LEDs each.

In this example, the powering on and off of the LED strings 2810, 2812 is controlled through enable pins 2808 of the multiple output string LED driver integrated circuit 2801. All the LEDs may have the same current or a different current for each LED string 2810, 2812. The filter circuit 2802 is used to detect the input signal, and individual string control enable pins 2808 are used to control the LED strings 2810, 2812. As a result, only two input wires are used and the pulse-width modulation signal controls the powering on and off of the LEDs.

Still referring to FIG. 28, it should be appreciated that other LED circuit configurations can be used instead of the LED strings 2810, 2812. For example, the configuration of FIG. 31A with the primary first light source 2320, the secondary first light source 2330, the two diodes 2322, 2324, e.g. inverse-polarity protection diodes, and circuit means or connection cable 2316 can replace one of the LED strings 2810 or 2812. In another example, the configuration of FIG. 31B with the primary first light source 2320, the secondary first light source 2330, the primary second light source 2320b, the secondary second light source 2330b, the four diodes 2322a, 2324a, 2322b, 2324b, e.g. inverse-polarity protection diodes, and the circuit means or connection cables 2316a, 2316b can replace both LED strings 2810, 2812.

FIG. 29 is a circuit diagram of another example of an electronic circuit 2820 for a rearview device lighting module having only two input wires.

Referring to FIG. 29, an electronic circuit 2820 includes a filter circuit 2822 with one or more outputs G1, G2, and an LED driver integrated circuit 2821 with one or more current set resistors 2824, a power source 2826, one or more transistors or semiconductor switches 2828 such as MOSFETS, a capacitor 2829 for ground, one or more input resistors 2831, a capacitor 2833 for keeping the LED current constant, and one or more LED strings 2830 with one or more LEDs each.

In this example, the powering on and off of the LED string 2830 is controlled through the control of the semiconductor switches 2828 such as MOSFETS or transistors across the LEDs which short the current passing across the LED. All the LEDS may have the same current and, in this example, different currents for different LEDs may not be possible. The filter circuit 2822 is used to detect the input and control the LED string 2830 with corresponding LEDs. As a result, only two input wires are used and the pulse-width modulation signal controls the powering on and off of the LEDs.

FIG. 30 is a circuit diagram of an additional example of an electronic circuit 2840 for a rearview device lighting module having only two input wires.

Referring to FIG. 30, an electronic circuit 2840 includes a filter circuit 2842 with one or more outputs G1, G2, and a typical LED printed circuit board 2841 without an LED driver integrated circuit and with a power source 2846, one or more transistors or semiconductor switches 2848 such as MOSFETS, and one or more LED strings 2850 with one or more LEDs each.

In this example, the powering on and off of the LED string 2850 is controlled through the control of the semiconductor switches 2848 such as MOSFETS or transistors across the LEDs which short the current passing across the LED. All the LEDS may have the same current and, in this example, different currents for different LEDs may not be possible. The filter circuit 2842 is used to detect the input and control the LED string 2850 with corresponding LEDs. As a result, only two input wires are used and the pulse-width modulation signal controls the powering on and off of the LEDs.

According to various aspects and example advantages, the electronic circuits 2800, 2820, 2840 provide a two wire solution for controlling multiple LED strings and LEDs. In some examples, expensive LED driver integrated circuits can be avoided which typically have enable pins equal to the number of output channels. In addition, the two wire LED control solution may be implemented using circuits without driver integrated circuits. Further, the described circuits can be applied to more than two LED strings with additional filters being added to the electronic circuits. As a result, the described control of LEDs may allow the following example lighting functions, among others: (A) the first LED string flashing while the second LED string is constantly on; (B) the first LED string constantly on while the second LED string is flashing; (C) both sets of LED strings flashing simultaneously at the same or different frequencies; or (D) both sets of LED strings being constantly on.

Example applications for the described electronic circuits 2800, 2820, 2840 include multi-color side turn indicator modules or any other lighting modules not limited to any number of LED output channels. With multiple LEDs, a user may increase the light intensity of a particular module by turning on multiple LEDs simultaneously such as increasing the intensity of a blind spot indication modules during the day time, fog conditions, or rain conditions by turning on additional LEDs. In addition, sequential lighting may be achieved such as the sequential lighting of a turn signal from one side to another. Further, the speed of sequential indications depending on the proximity of an adjacent vehicle such as for use with a blind spot indicator may be efficiently controlled using the described circuits. It should be appreciated that the described electronic circuits 2800, 2820, 2840 allow for the use of a single printed circuit board for the control of multiple lighting modules such as side turn indicator, blind spot indicator, puddle lamps, logo lamps, among others as is well known to a person having ordinary skill in the art.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. A control circuit for an illumination module in a vehicle, comprising:
    an input channel for receiving a pulse width modulated (PWM) signal;
    a filter configured to extract information received by the input channel;
    one or more first light sources;
    one or more second light sources;
    a first output channel which is adapted to control on and off states of the one or more first light sources depending on the extracted information; and
    a second output channel which is adapted to control on and off states of the one or more second light source connected to the second output channel depending on the extracted information; and
    an electronic circuit connected to the first output channel and comprising:
        a circuit carrier which comprises the one or more first light sources; and
        at least one circuit connection mounted to the circuit carrier, the circuit connection being coupled to at least one of the one or more first light sources,
    wherein at least one of the one or more first light sources are supplied with current corresponding to a voltage applied to the circuit connection, and
    wherein the voltage applied to the circuit connection comprises an on-board voltage of the vehicle.

2. The control circuit of claim 1, wherein the one or more first light sources and the one or more second light sources comprise light-emitting diodes.

3. The control circuit of claim 1, wherein the one or more first light sources comprise a primary first light source and a secondary first light source,
    wherein the electronic circuit further comprises a first circuit part assigned to the primary first light source and a second circuit part assigned to the secondary first light source, and
    wherein, in use, the primary first light source and the secondary first light source emit light having different wavelengths.

4. The control circuit of claim 3, wherein at least one of the first circuit part and the second circuit part comprises two diodes switched inversely to one another.

5. The control circuit of claim 4, wherein the two diodes switched inversely to one another comprise a first inverse-polarity protection diode switched in series with the primary first light source and a second inverse-polarity protection diode switched in series with the secondary first light source.

6. The control circuit of claim 5, wherein the two serial connections of the primary first light source and the first inverse-polarity protection diode and the secondary first light source and second inverse-polarity protection diode are switched parallel to one another.

7. The control circuit of claim 6, wherein the electronic circuit has a capacitance which is switched parallel to the two serial connections of the primary first light source and the first inverse-polarity protection diode and the secondary first light source and the second inverse-polarity protection diode.

8. The control circuit of claim 7, wherein the electronic circuit has a connection cable which connects the two serial connections of the primary first light source and the first inverse-polarity protection diode and the secondary first light source and the second inverse-polarity protection diode to the circuit connection.

9. The control circuit of claim 7, wherein the capacitance comprises exclusively the connection cable.

10. The control circuit of claim 1, wherein the electronic circuit comprises at least one of an electronic circuit of a blind-spot monitoring display and a route indicator.

11. The control circuit of claim 1, further comprising another electronic circuit connected to the second output channel, and comprising
a circuit carrier which comprises the one or more second light sources; and
at least one circuit connection mounted to the circuit carrier, the circuit connection being coupled to at least one of the one or more second light sources.

12. The control circuit of claim 1, wherein the first output channel is adapted to turn at least one of the one or more first light sources on and the second output channel is adapted to turn at least one of the one or more second light sources off based on a first PWM signal,
wherein the first output channel is adapted to turn at least one of the one or more first light sources off and the second output channel is adapted to turn at least one of the one or more second light sources on based on a second PWM signal, and
wherein the first output channel is adapted to turn at least one of the one or more first light sources on and the second output channel is adapted to turn at least one of the one or more second light sources on, at the same time, based on a third PWM signal.

13. The control circuit of claim 12, wherein, in response to either the first PWM signal or the second PWM signal being transmitted consecutively with the third PWM signal during a period of time, one of the one or more first light sources or the one or more second light sources is permanently lit while another of the one or more first light sources or the one or more second light sources flashes on and off.

14. The control circuit of claim 12, wherein the first PWM signal comprises a duty cycle rate of 20%, the second PWM signal comprises a duty cycle rate of 100%, and the third PWM signal comprises a duty cycle rate of 80%.

15. The control circuit of claim 12, wherein the filter is configured to extract information from each of the first PWM signal, the second PWM signal, and the third PWM signal.

16. The control circuit of claim 1, wherein the one or more first light sources and the one or more second light sources comprise at least one light each or an array of lights, wherein the one or more first light source comprises a first light having a first color, and wherein the one or more second light sources comprises a second light having a second color.

17. The control circuit of claim 16, wherein the first and second colors are different colors, and wherein the first and second light sources are provided in a side-turn indicator.

18. The control circuit of claim 1, wherein each of the one or more first light sources and the one or more second light sources comprises at least one of a Light Emitting Diode (LED), a light bulb, a halogen lamp, an arc lamp, a Xenon arc lamp, a fluorescent lamp, a neon lamp, and an electrodeless lamp.

19. The control circuit of claim 1, wherein at least one of the first output channel or the second output channel comprises a delay circuit for time delaying the at least one of the first output channel or second output channel.

20. The control circuit of claim 1, wherein the PWM signal comprises a supply voltage for at least one of the one or more first light sources or the one or more second light sources.

* * * * *